(12) United States Patent
Pitbladdo

(10) Patent No.: US 8,499,584 B2
(45) Date of Patent: Aug. 6, 2013

(54) MOLTEN GLASS DELIVERY APPARATUS FOR OPTICAL QUALITY GLASS

(75) Inventor: Richard B. Pitbladdo, Naples, FL (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 13/469,218

(22) Filed: May 11, 2012

(65) Prior Publication Data

US 2012/0216577 A1   Aug. 30, 2012

Related U.S. Application Data

(62) Division of application No. 12/057,697, filed on Mar. 28, 2008, now Pat. No. 8,196,434.

(60) Provisional application No. 60/954,622, filed on Aug. 8, 2007, provisional application No. 60/957,007, filed on Aug. 21, 2007.

(51) Int. Cl.
    *C03B 5/18*      (2006.01)
    *C03B 5/187*     (2006.01)

(52) U.S. Cl.
    CPC .................................. *C03B 5/1875* (2013.01)
    USPC ............................. 65/178; 65/135.3; 65/135.4

(58) Field of Classification Search
    CPC .................................. C03B 5/1875; C03B 7/14
    USPC ................... 65/135.2, 135.3, 135.4, 178, 347
    See application file for complete search history.

(56) References Cited

U.S. PATENT DOCUMENTS

| | | | |
|---|---|---|---|
| 3,338,696 A | 8/1967 | Dockerty | |
| 3,723,084 A | 3/1973 | Colchagoff | |
| 4,278,460 A | 7/1981 | Chrisman et al. | |
| 5,316,563 A * | 5/1994 | Ishimura et al. | 65/32.5 |
| 5,885,315 A * | 3/1999 | Fredholm et al. | 65/102 |
| 6,119,484 A * | 9/2000 | Takei et al. | 65/134.2 |
| 6,748,765 B2 | 6/2004 | Pitbladdo | |
| 6,763,684 B2 | 7/2004 | Pitbladdo | |
| 6,889,526 B2 | 5/2005 | Pitbladdo | |
| 6,895,782 B2 | 5/2005 | Pitbladdo | |
| 6,990,834 B2 | 1/2006 | Pitbladdo | |
| 6,997,017 B2 | 2/2006 | Pitbladdo | |

(Continued)

FOREIGN PATENT DOCUMENTS

| | | |
|---|---|---|
| EP | 0775671 A1 | 5/1997 |
| JP | 63030329 A | 2/1988 |

*Primary Examiner* — Christina Johnson
*Assistant Examiner* — Cynthia Szewczyk
(74) *Attorney, Agent, or Firm* — Matthew J. Mason; Stephen S. Wentsler

(57) ABSTRACT

A molten glass delivery system is modified to match it with the overflow downdraw process. A substantial number of defects not removed by the finer are diverted to the unusable inlet and distal edges of the sheet. In one embodiment, the stirring device is relocated from the outlet to the inlet of the finer. In another embodiment, the basic shape of the finer is preferably changed from a cylindrical shape to a Double Apex (or Gull Wing) shaped cross-section, whereby the apexes of the finer contain the glass that will form the unusable inlet end of the glass sheet. The finer vent or vents are preferably located at these apexes such that any homogeneity defects caused by the vents are diverted to the unusable inlet end of the glass sheet. The finer cross-section has a high aspect ratio for increased fining efficiency as compared to a cylindrical finer.

8 Claims, 35 Drawing Sheets

U.S. PATENT DOCUMENTS

| | | |
|---|---|---|
| 7,150,165 B2 | 12/2006 | Pitbladdo |
| 7,155,935 B2 | 1/2007 | Pitbladdo |
| 2001/0039812 A1 | 11/2001 | Romer et al. |
| 2004/0134235 A1 | 7/2004 | Pitbladdo |
| 2005/0061031 A1 | 3/2005 | Kato et al. |
| 2005/0092027 A1 | 5/2005 | Pitbladdo |
| 2005/0183455 A1 | 8/2005 | Pitbladdo |
| 2006/0016219 A1 | 1/2006 | Pitbladdo |
| 2006/0042314 A1 | 3/2006 | Abbott, III et al. |
| 2006/0042318 A1* | 3/2006 | Burdette et al. ............. 65/134.2 |
| 2006/0101859 A1 | 5/2006 | Takagi et al. |
| 2006/0293162 A1 | 12/2006 | Ellison |
| 2007/0056323 A1 | 3/2007 | Pitbladdo |
| 2007/0068197 A1 | 3/2007 | Pitbladdo |
| 2007/0084247 A1 | 4/2007 | Pitbladdo |
| 2007/0144210 A1 | 6/2007 | Pitbladdo |
| 2009/0282872 A1* | 11/2009 | Tomamoto et al. ............... 65/66 |

* cited by examiner

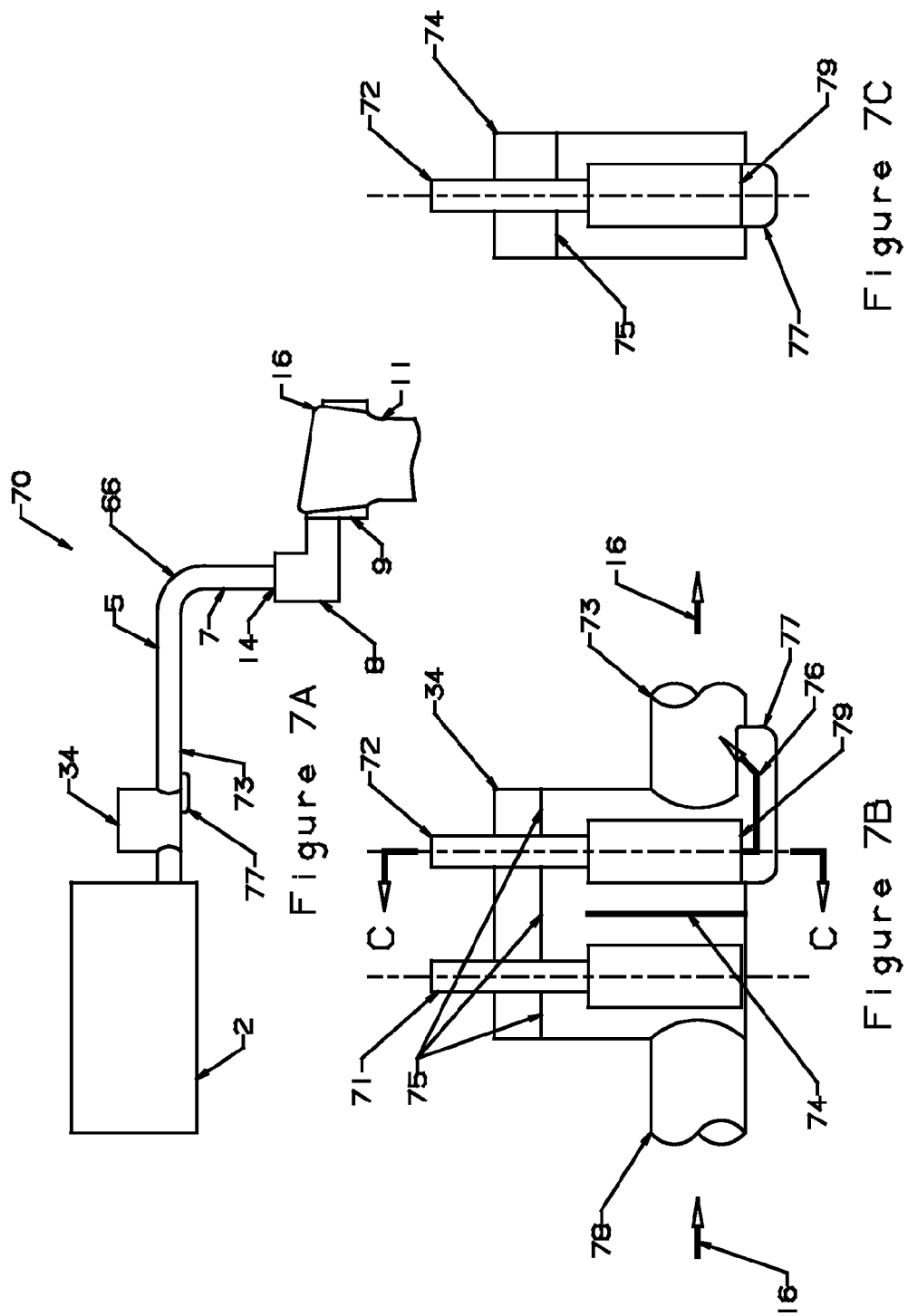

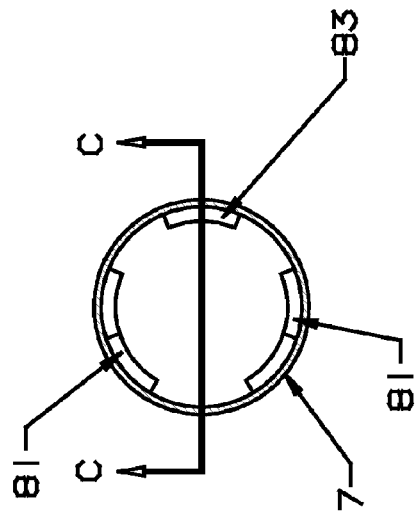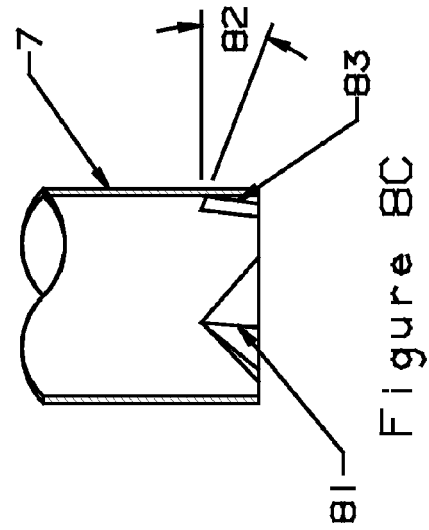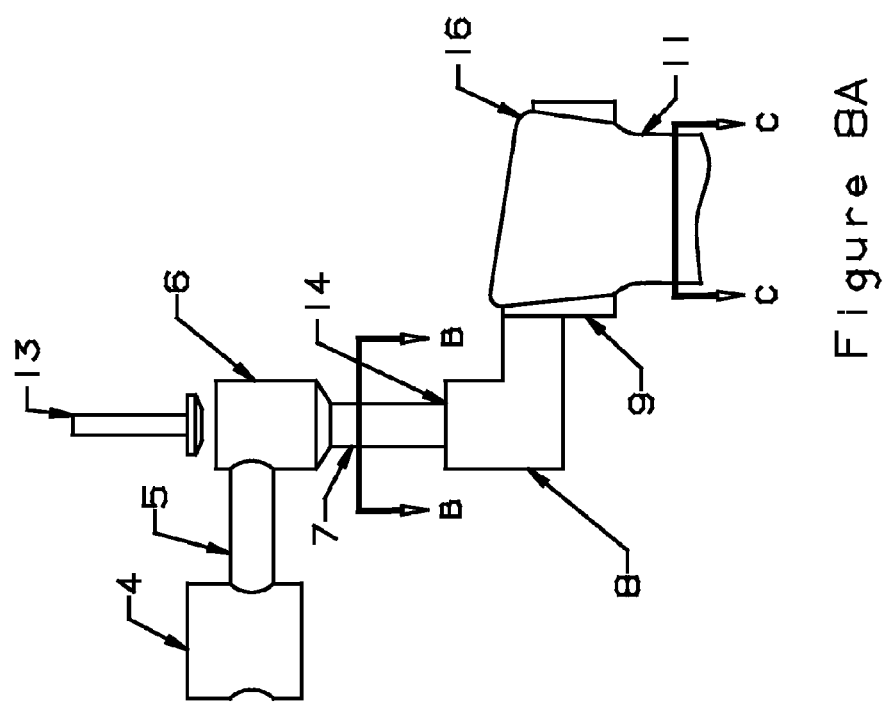

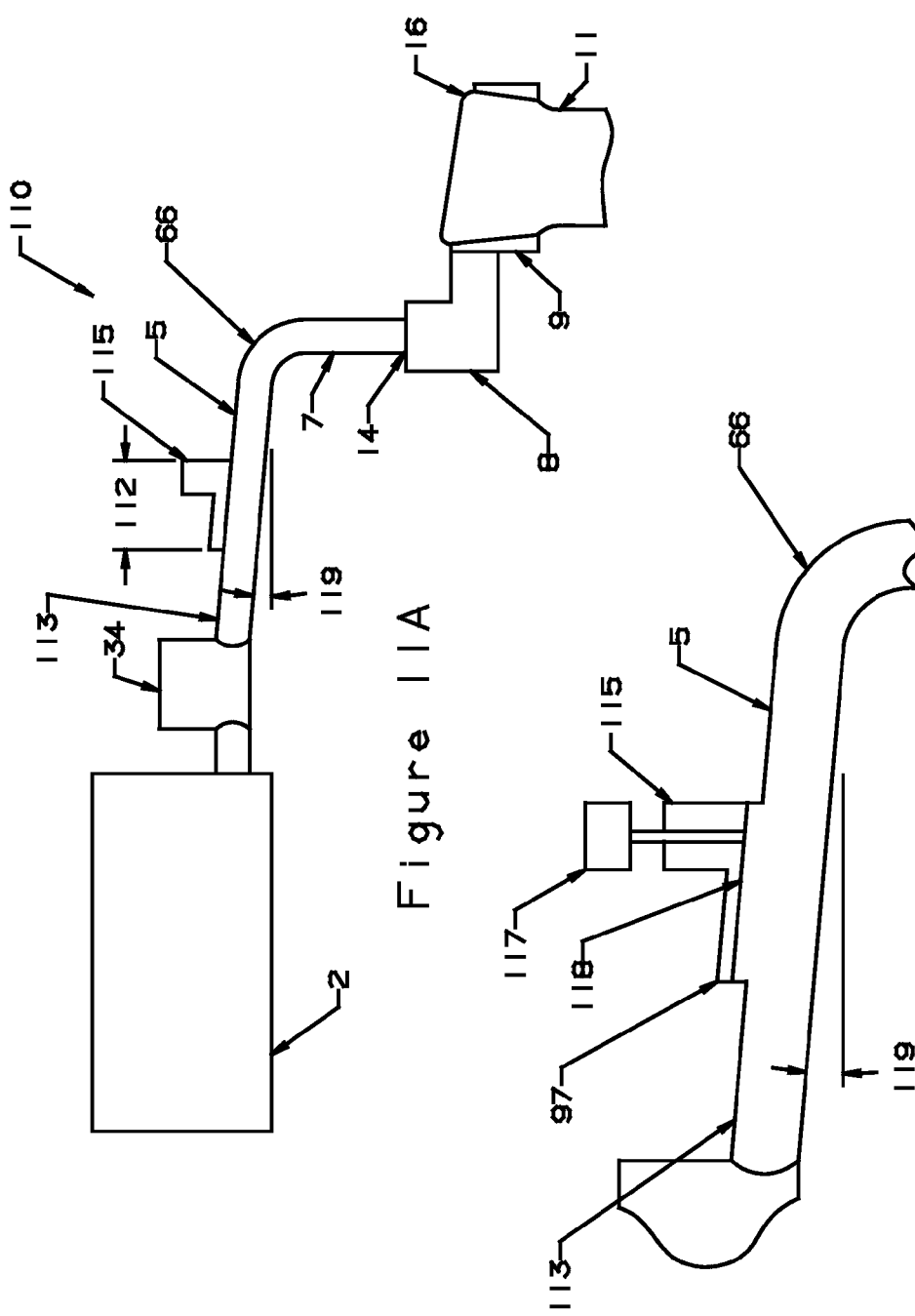

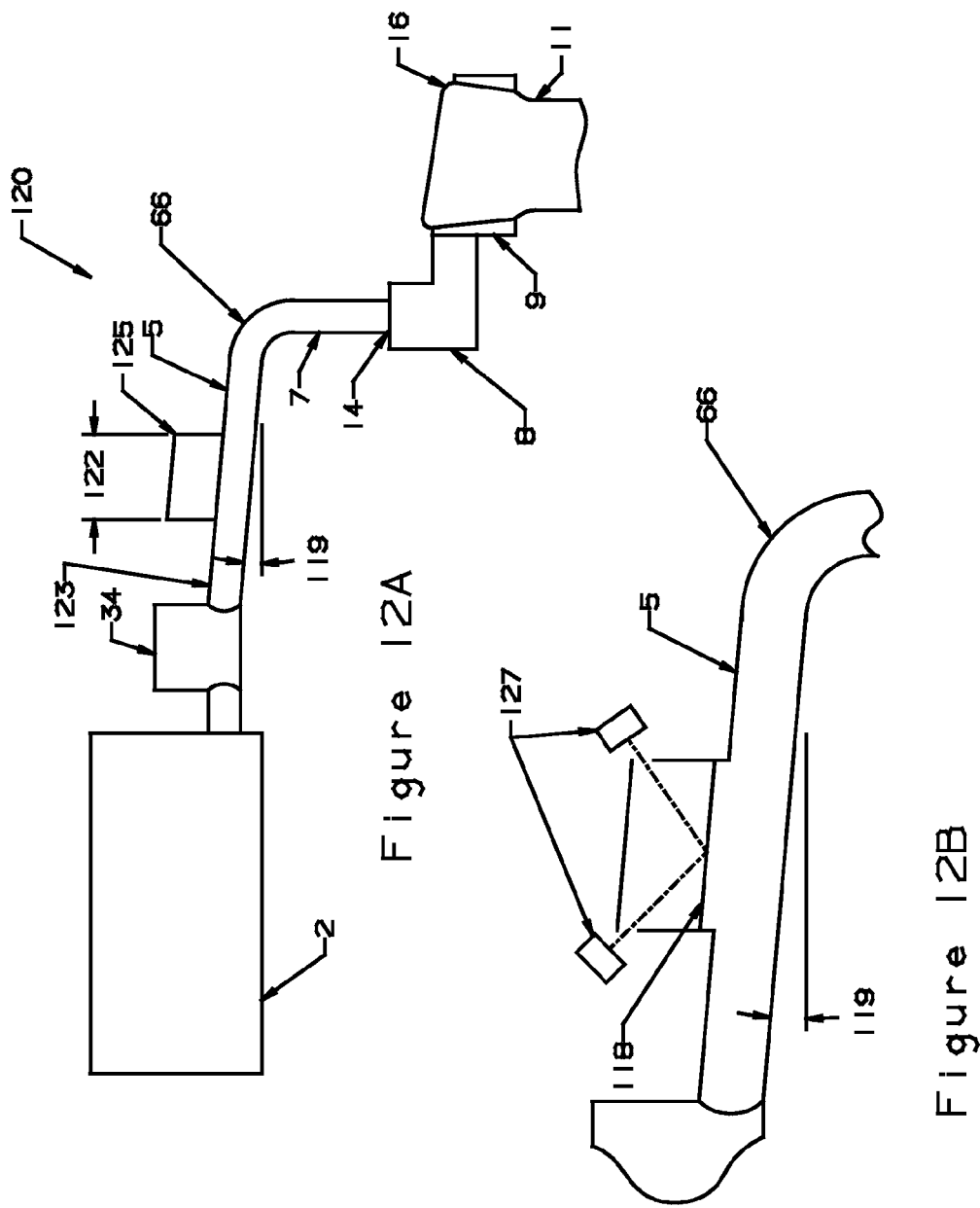

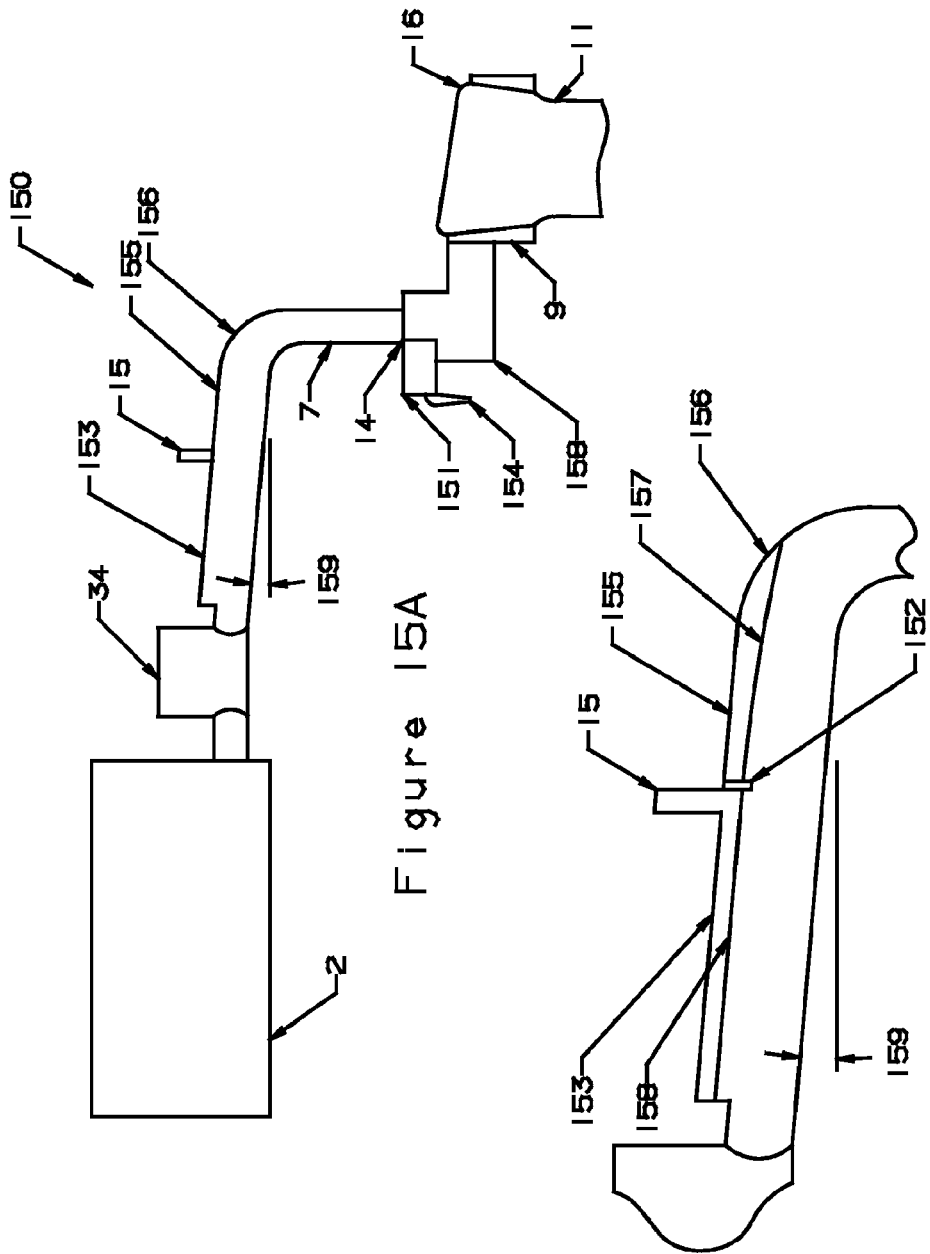

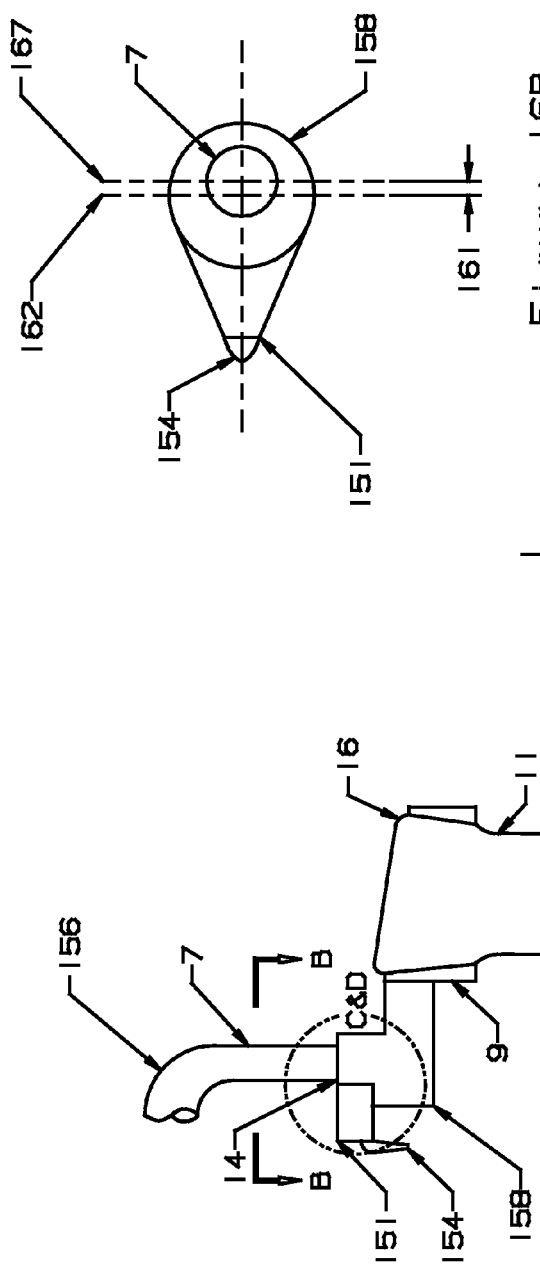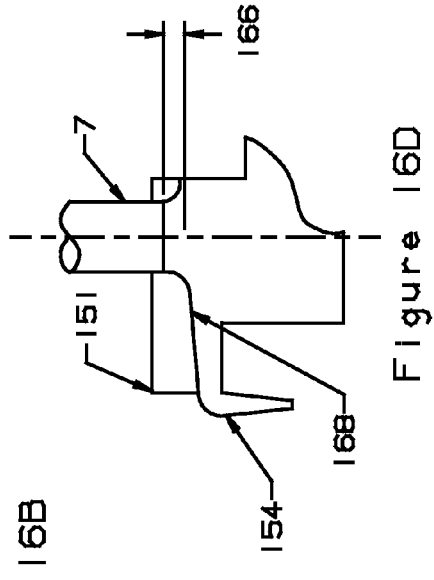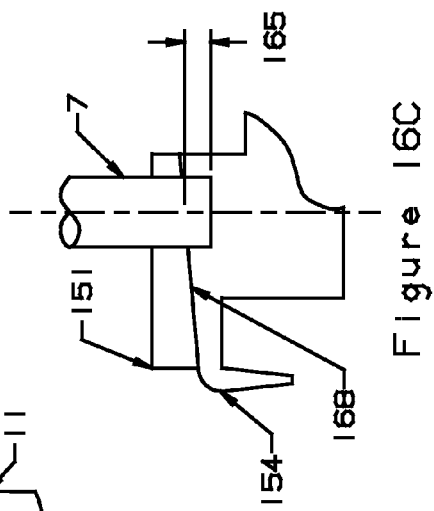

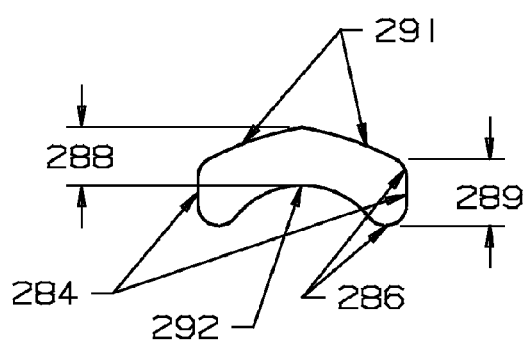
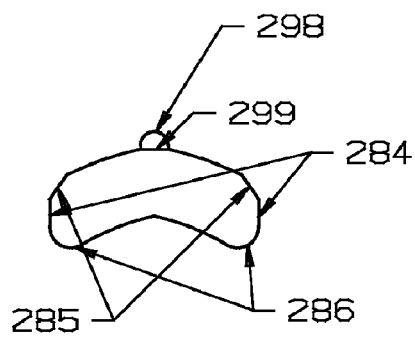
Figure 29E  Figure 29F
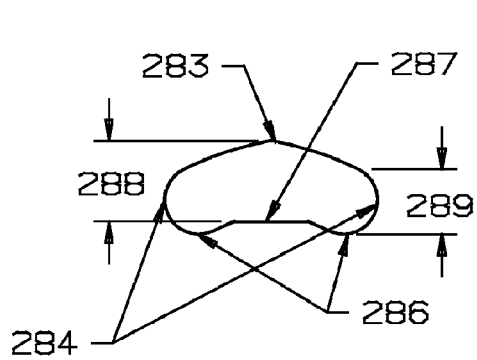
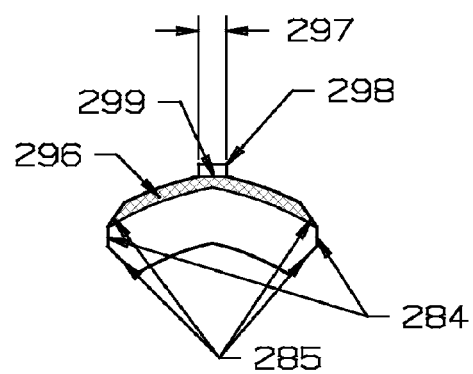
Figure 29G  Figure 29H

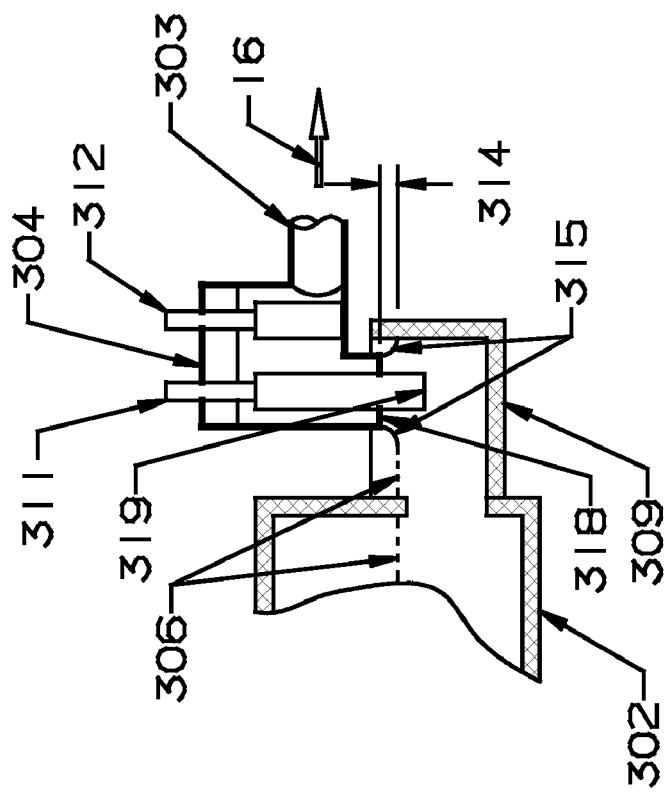
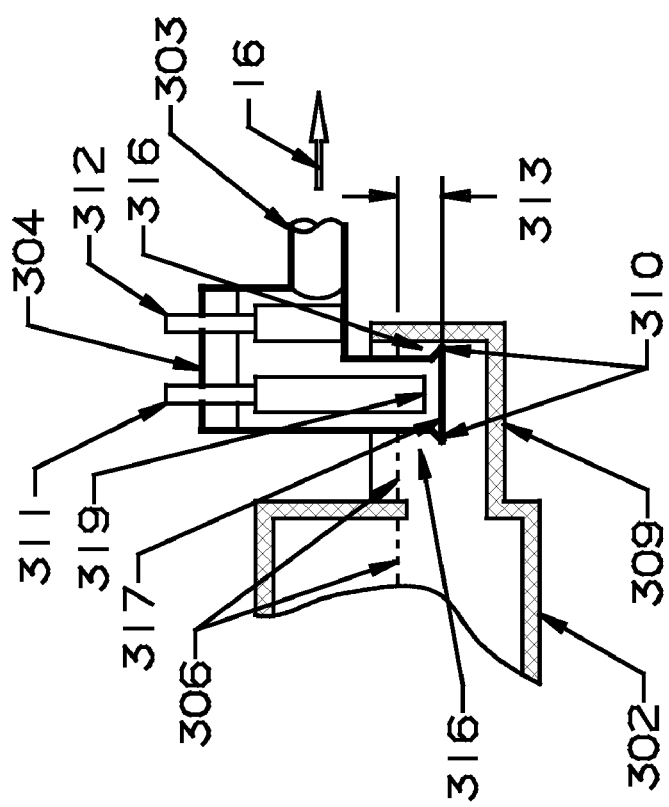
Figure 31B
Figure 31A

MOLTEN GLASS DELIVERY APPARATUS FOR OPTICAL QUALITY GLASS

REFERENCE TO RELATED APPLICATIONS

This application is a divisional of prior application Ser. No. 12/057,697, filed Mar. 28, 2008, that claims one or more inventions which were disclosed in Provisional Application Number 60/954,622, filed Aug. 8, 2007, entitled "MOLTEN GLASS DELIVERY APPARATUS FOR THE OVERFLOW DOWNDRAW SHEET FORMING PROCESS" and Provisional Application Number 60/957,007, filed Aug. 21, 2007, entitled "MOLTEN GLASS DELIVERY APPARATUS FOR THE OVERFLOW DOWNDRAW SHEET FORMING PROCESS". Each of the aforementioned applications is hereby incorporated by reference in its entirety and the benefit under 35 USC §119(e) of the aforementioned United States provisional applications is hereby claimed.

BACKGROUND OF THE INVENTION

1. Field of the Invention

This invention relates generally to the manufacture of optical quality glass. More specifically, it is especially useful for the manufacture of glass sheet made by the overflow downdraw process for the production of TFT/LCD display devices that are widely used for television and computer displays.

2. Description of Related Art

The typical glass manufacturing process includes, in series, a raw material storing, mixing, and feeding system, a glass melting furnace, a molten glass delivery system, a glass forming process, and a finished glass handing system for cutting, cleaning, packaging and shipping.

FIG. 1 shows a typical "Overflow Process" manufacturing system (1). The melting furnace (2) feeds liquid glass (16) of substantially uniform temperature and chemical composition to the finer (3), which removes any gaseous inclusions through the finer vent (15) and feeds a stirring device (4), also known as a stirring apparatus (4). The stirring device (4), including one or more stirrers, thoroughly homogenizes the glass. The stirring device (4) is always placed after the finer (3) in the prior art, to remove inhomogeneities in the glass which may be created in the finer (3).

The glass (16) is then conducted through a cooling and conditioning section (5), into a bowl (6), and down into the downcomer pipe (7), through the joint (14) between the downcomer pipe (7) and the forming apparatus inlet pipe (8), to the inlet of the overflow trough (9). While flowing from the stirring device (4) to the trough (9), the glass (16), especially that which forms the sheet surface, must remain homogeneous. The bowl (6) alters the flow direction from horizontal to vertical and provides a means for stopping the flow of glass (16). A needle (13) is often provided to stop glass flow. The downcomer pipe (7) has two primary functions. It conducts the glass from the bowl (6) to the trough inlet pipe (8) and controls the flow rate of the glass (16) entering the sheet forming apparatus. The downcomer pipe (7) is carefully designed such that, by maintaining it at a specific temperature, the desired glass (16) flow rate is precisely maintained at the desired value. The finer (3), the finer vent (15), the stirring device (4), the cooling and conditioning section (5), the bowl (6), the needle (13), and the downcomer pipe (7) comprise the glass delivery system (10), which conducts and conditions the glass (16) from the furnace to the top of the inlet pipe (8) of the overflow process. The joint (14) between the downcomer pipe (7) and the trough inlet pipe (8) allows for removal of the sheet glass forming apparatus for service as well as providing compensation for the thermal expansion of the process equipment.

The glass (16) flowing from the furnace (2) is at a high temperature (1500° to 1600° C.) and is a Newtonian liquid, but has gaseous inclusion defects and is not a homogeneous mixture. The delivery system (10) delivers the glass to the overflow forming process at the correct temperature (approximately 1225° C.), in a homogeneous state with a minimum of gaseous inclusions or other homogeneity defects.

The molten glass (16) from the delivery system (10), which must be of substantially uniform temperature and chemical composition, enters the sheet forming apparatus through the inlet pipe (8) to the sheet forming trough (9). The glass sheet forming apparatus, which is described in detail in U.S. Pat. Nos. 3,338,696, 6,748,765, and 6,889,526, herein incorporated by reference, is a wedge shaped forming device (9). The glass (16) then flows down each side of the wedge shaped forming device (9), and joins at the pointed bottom edge to form a sheet of molten glass (11). The sheet of molten glass (11) is then cooled to form a solid glass sheet (12) of substantially uniform thickness.

Glass as melted from raw materials has many small bubbles of entrapped gases. These bubbles are considered defects in any glass product which requires optical properties. Bubbles of a size that can be seen by the eye or that interfere with the function of the product must be removed. The process for removing these bubbles is termed either fining or degassing (fining herein). Fining occurs after the glass is melted from raw materials, but before the glass is formed into a finished product. In optical quality glass, this fining process is performed in a "finer" (or refiner), which is constructed of precious metal, typically platinum or a platinum alloy. The fining process is both chemical and physical. Chemicals, termed fining agents, are added to the glass such that the bubbles grow in size as they pass through the glass melting furnace and the finer. Arsenic or Antimony as oxides in the glass are preferred fining agents, but are toxic materials. Tin is another commonly used fining agent, but it is less effective as a fining agent and it chemically reduces platinum, producing tiny particles and causing eventual destruction of the platinum walls. Cerium may also be used as a fining agent, but colors the glass yellow. These are the most used among the fining agents, however, there are others known in the art.

Optical quality glass is unique in that disruptions in the flow path often produce a homogeneity defect. This defect class is called cord and it produces optical distortion in the product. The finer often is designed with baffles as discussed herein. Baffles and the finer vent (15) or vents produce significant flow disruptions. For this reason, in the prior art, the stirring device (4) is placed after the finer (3) in the flow path such that inhomogeneities from the finer are homogenized. Both the finer and stirring device operate at a high temperature of approximately 1600° C. The glass discharged from the stirring device is substantially homogeneous, although the stirring device (4) can itself produce a homogeneity defect, which is discussed herein. To minimize the further creation of inhomogeneities, the cooling and conditioning pipe (5), the bowl (6), and the downcomer pipe (7) are carefully finished (smoothed) on the glass contact surfaces to minimize flow path disruptions. In the delivery system, it is desirable to maintain the flow uniform with no regions of quiescent or recirculating flow and a minimum exposure to the atmosphere. Exposure to the atmosphere can cause volatilization of some of the glass chemicals and thus change the glass composition and properties, potentially introducing homogeneity defects. The temperature of the glass in the delivery system must be maintained above the liquidus temperature of the glass to prevent recrystallization (devitrification) of the glass, which would be an optical defect. The bowl, which in many designs has a free surface, can be a source of cord and devitrification defects.

The fining apparatus is designed such that the removal of the bubbles from the molten glass is optimized. The finer is often very large, resulting in extremely high costs to fabricate because the glass contact surfaces are constructed of platinum or platinum alloy. In the prior art fining process, the bubbles rise to the top of the fining apparatus (finer) where they dissipate to the atmosphere through the finer vent (15). The size of the bubbles that are removed is a function of the size and design of the finer and the viscosity (fluidity) of the molten glass. In the glass industry, these bubbles are called seeds if they are small (less than approximately 1 mm diameter) and blisters if they are large. Seeds are the primary concern as they are small in diameter and therefore are more difficult to remove from the glass.

The glass seed entering the finer at the bottom of the inflow end of the finer must rise to the top of the finer at the outflow end where a vent to the atmosphere is located.

The vertical speed of a seed in glass is inversely proportional to the glass viscosity, proportional to the square of the seed diameter, and proportional to the square of the glass density. The glass viscosity is a strong inverse function of temperature, therefore raising the glass temperature to a practical maximum increases the vertical speed of a given size seed. The detection of a seed in an optical product is a strong function of its viewable area, therefore one can use the diameter squared of a seed as the quality criteria. For a given glass, the variation of the glass density in the fining process is a second order effect.

At the very high temperatures, approximately 1600° C., required to substantially reduce the glass viscosity, even the highest quality refractory materials are slowly dissolved by the glass. This introduces contamination and can also generate additional seeds in the glass. In the prior art, a cylindrical platinum or platinum alloy (platinum herein) tube is used for all surfaces (walls) that contact the glass, such that the glass is not contaminated by the dissolution of refractory walls. The cylindrical tube is typically supported externally by refractory material (brick), which has the appropriate strength and insulating properties. The glass in the finer must be maintained at the required elevated temperature. Additionally, the glass entering the inflow end of the finer often must be heated to the desired fining temperature. This is done by either containment of the platinum and refractory finer assembly in a heated (gas or electric) firebox or by electrical heating. The electrical heating of the finer is accomplished by either externally mounted electric windings (normally made of platinum) or the passing of electric current directly through the cylindrical platinum tube, thus using the electrical resistance of the tube to generate the heat.

The prior art design which has been typically used since the start of this practice in the first half of the twentieth century is a cylindrical platinum tube either with or without internal baffles. The primary innovations to date have been in the design of the baffles to alter the flow path and to trap seeds for optimal seed removal. The prior art includes finer designs with and without an internal free surface.

FIG. 2A is a typical baffled finer of the prior art. The molten glass (16) enters the baffled finer (21) at the glass inlet end (23) and flows out the outlet (24). There is a vent (25) at the outlet end (24), which is connected to the atmosphere, to allow the seeds which accumulate at the top of the baffled finer (21) to escape. Some of the baffles (26) have holes (22), which are sized to distribute the flow of the molten glass (16) such that the average residence time for the glass as it flows through the baffled finer (21) is more uniform. Other baffles (28) are designed to move the flow path vertically. There is often a vent (29) in front of a baffle, as baffles also trap the surface seeds into a foam-like accumulation, which breaks down and dissipates into the atmosphere. FIG. 2B shows the movement of seeds (27) through the baffled finer (21). The baffles (26) and (28) make the paths of the seeds (27) in the baffled finer (21) quite tortuous. This allows the smaller seeds greater opportunity to coalesce together and form a larger seed, which in turn will rise faster.

The finer shown in FIGS. 2A and 2B has a diameter of 0.382 meters and a length of 2.5 meters. The glass flow rate is 7.41 metric tons per day. The glass viscosity is 100 poise. The seed diameter is 0.0007 meters. These parameters can be changed by normalizing using the equation:

$$Q_1 * d_1^2 / \eta_1 = Q_0 * d_0^2 / \eta_0$$

where:
Q equals glass flow,
η equals glass viscosity, and
d equals seed diameter The prior art stirring device (4) consists of one or more rotating elements. The glass at the tip of the final rotating element is often trapped in a vortex. Glass exiting this vortex has a rotating motion and a different time history than the glass in the main flow path. This can result in a cord homogeneity defect if this glass is part of the salable portion of the product.

DRAWBACKS OF THE PRIOR ART

A major drawback of the prior art is that the homogenization of the glass after the fining operation redistributes any defects not removed by the finer throughout the entire glass stream.

Another drawback specific to tin refined glasses is that the platinum particles, which are caused by the chemical reduction of platinum by tin in the finer and which would normally flow close to the delivery system surfaces, are redistributed throughout the entire sheet by the stirring of the glass after it has been processed by the finer.

Another drawback is that the inhomogeneous glass discharged from the tip of the stirrer creates defects in the formed glass sheet. Yet another drawback is the inhomogeneous glass discharged from the free surface in the bowl.

Another drawback is that the use of temperature to control glass flow rate has an inherent low control bandwidth.

Another drawback is that the solid connection of the melting furnace to the delivery system prevents major repair or rebuild of the melting furnace without also rebuilding a major portion of the delivery system.

SUMMARY OF THE INVENTION

The present invention significantly modifies the prior art glass delivery system from the furnace to the glass forming process to match it with the overflow downdraw process. A substantial number of defects not removed by the finer are diverted to the unusable inlet and distal edges of the sheet. In one embodiment, the stirring device is relocated to the inlet of the finer from the outlet of the finer. In another embodiment, the basic shape of the finer is preferably changed from a cylindrical shape to a Double Apex (or Gull Wing) shaped cross-section whereby the apexes of the finer contain the glass that will form the unusable inlet end of the glass sheet. The finer vent or vents are preferably located at these apexes such that any homogeneity defects caused by the vents are diverted to the unusable inlet end of the glass sheet. The finer cross-section has a high aspect ratio for increased fining efficiency as compared to a cylindrical finer.

Another embodiment eliminates the bowl and the needle. In other embodiments, the finer vent may be eliminated when the apparatus is being used with some specific glasses. In additional embodiments, glass level measuring devices are preferably installed at the finer vents. In yet another embodiment, baffles are added to the bottom of the downcomer pipe to divert flow that is adjacent to the downcomer pipe surface into the unusable inlet and distal edges of the sheet.

In another embodiment the stirrer speed is used to increase the bandwidth of glass flow rate control.

In another embodiment, the fixed connection of the delivery system to the melting furnace is replaced with an adjustable and flexible connection so that a melting furnace that is no longer functioning can be easily removed from the delivery system for repair or replacement.

The present invention improves the fining capability of the delivery system apparatus by matching the flow characteristic of the delivery system to the overflow downdraw process.

BRIEF DESCRIPTION OF THE DRAWINGS

FIG. 7A shows the principle parts of "The Overflow Process" glass sheet manufacturing system in an embodiment of the present invention.

FIG. 7B shows a cross-section of a stirring device that will alter glass flow rate in an embodiment of the present invention.

FIG. 7C shows a cross-section of the stirring device across lines C-C of FIG. 7B.

FIG. 8A shows flow diverters located at the bottom of the downcomer pipe in an embodiment of the present invention.

FIG. 8B shows a cross-section of the downcomer pipe in an embodiment of the present invention, across lines B-B of FIG. 8A.

FIG. 8C shows a cross section of the downcomer pipe in an embodiment of the present invention, across lines C-C of FIG. 8B.

FIG. 11A shows the principle parts of "The Overflow Process" glass sheet manufacturing system with a sloped finer in an embodiment of the present invention.

FIG. 11B shows a cross-section of a finer vent containing a mechanical glass level measuring device in an embodiment of the present invention.

FIG. 12A shows the principle parts of "The Overflow Process" glass sheet manufacturing system with a sloped finer in an embodiment of the present invention.

FIG. 12B shows a cross-section of a finer vent containing a laser glass level measuring device in an embodiment of the present invention.

FIG. 15A shows the principle parts of "The Overflow Process" glass sheet manufacturing system with a sloped finer with a full length free surface and an overflow device at the downcomer to inlet pipe interface in an embodiment of the present invention.

FIG. 15B shows a cross-section of a full length free surface finer shown in FIG. 15A containing a surface baffle at the finer vent in an embodiment of the present invention.

FIG. 16A shows the location of the overflow device at the downcomer to inlet pipe interface in an embodiment of the present invention.

FIG. 16B is a top view of the overflow device in an embodiment of the present invention.

FIG. 16C is a side view section showing the bottom of the overflow pipe located below the glass free surface in the overflow device in an embodiment of the present invention.

FIG. 16D is a side view section showing the bottom of the overflow pipe located above the glass free surface in the overflow device in an embodiment of the present invention.

FIG. 27C shows a square cross-section of a finer.

FIG. 27D shows a rectangular cross-section of a finer in an embodiment of the present invention.

FIG. 27F shows a rectangular with curved sides cross-section of a finer in an embodiment of the present invention.

FIG. 29E shows a five sided Gothic arch roof finer cross-section with a curved bottom and radii at the ends in an embodiment of the present invention.

FIG. 29F shows a six sided Gothic arch roof finer cross-section with radii and chamfers at the ends in an embodiment of the present invention.

FIG. 29G shows a seven sided Gothic arch roof finer cross-section with radii at the ends in an embodiment of the present invention.

FIG. 29H shows a six sided Gothic arch roof finer cross-section with fining ribs and chamfered ends in an embodiment of the present invention.

FIG. 31A shows a detail of an interface between a melting furnace forebay and the stirring device in an embodiment of the present invention.

FIG. 31B shows a detail of an interface between a melting furnace forebay and the stirring device in an embodiment of the present invention.

DETAILED DESCRIPTION OF THE INVENTION

Figure 1:
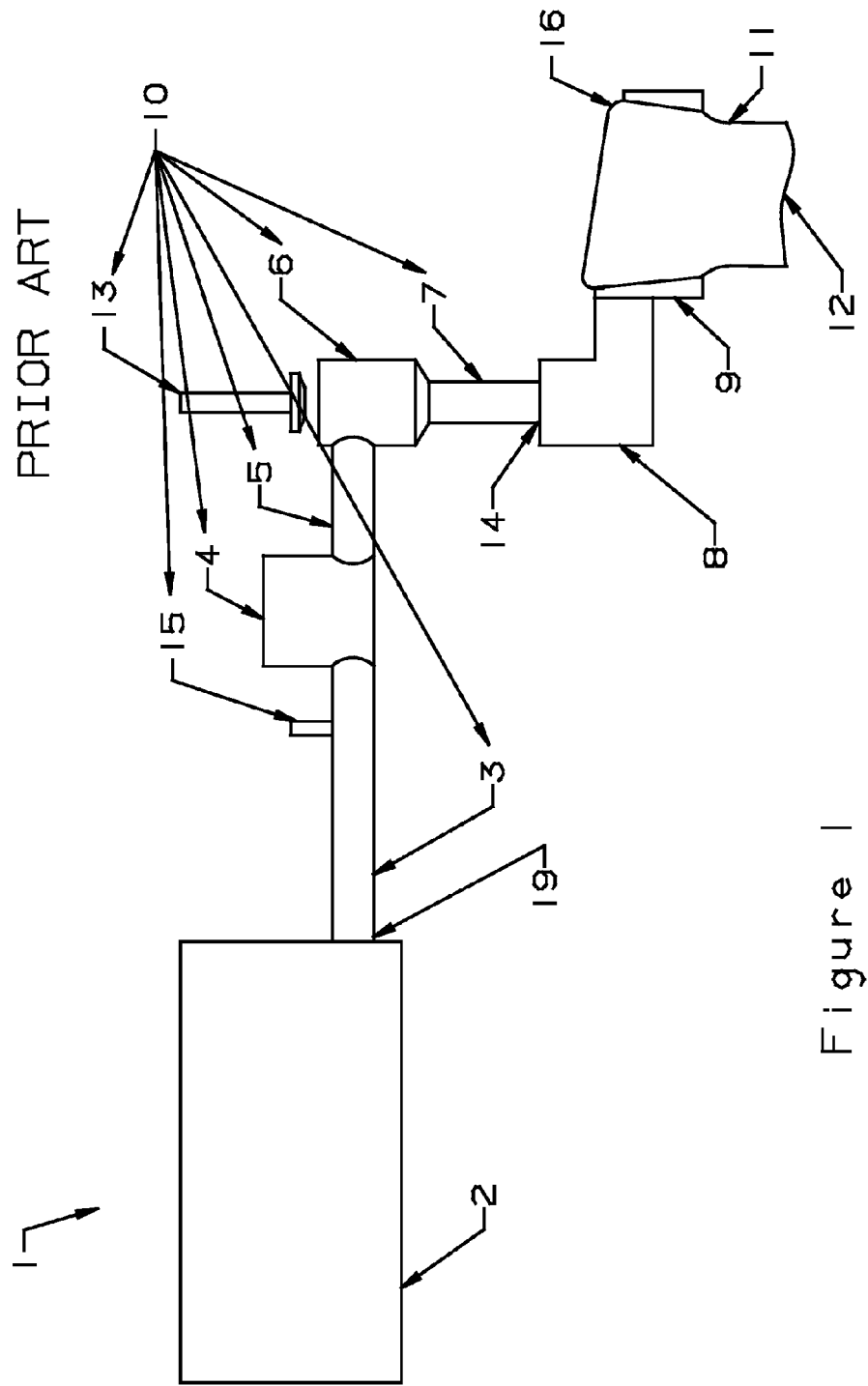
FIG. 1 illustrates the principle parts of "The Overflow Process" glass sheet manufacturing system.
Figure 2A:
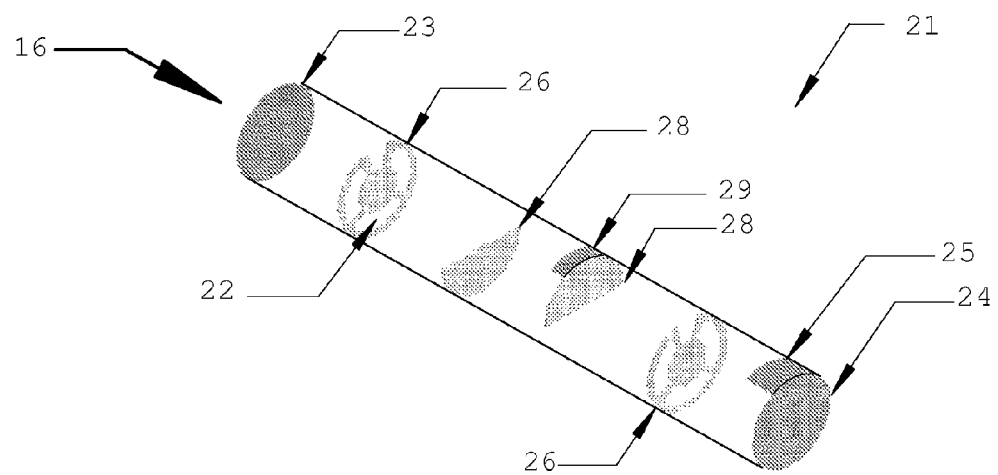
FIG. 2A shows a cylindrical finer with baffles as known in the prior art.
Figure 2B:
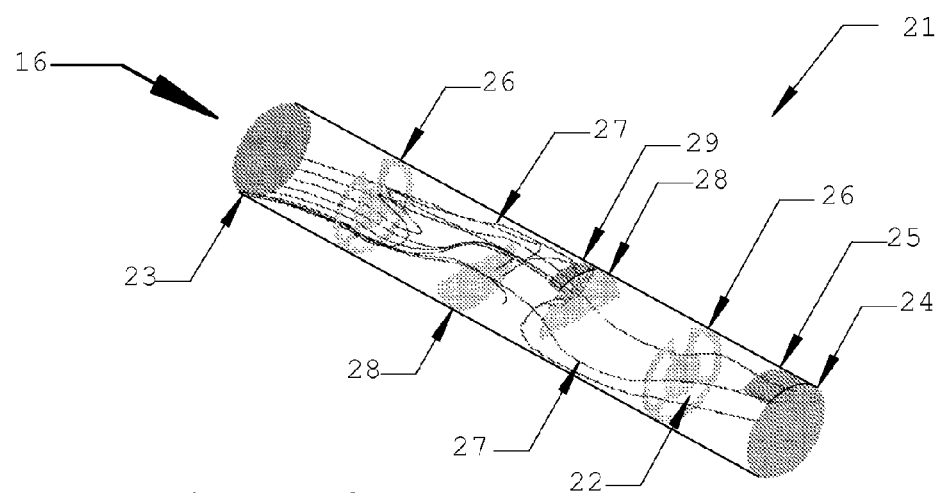
FIG. 2B shows the rising of seeds in the finer of FIG. 2A.

The present invention relates to the apparatus termed the delivery system, which transfers and conditions the glass from the furnace to the forming process. The flow characteristics of the glass in the overflow downdraw process are unique and of a character that has led to the invention of a new configuration of the delivery system. The present invention reorganizes and redesigns the component parts of the delivery system and allows for the use of equipment thought detrimental to the quality requirements of the overflow downdraw process.

The present invention is related to the physical aspect of fining, which is affected by the shape of the finer apparatus. Specifically, in one embodiment, the shape of the fining apparatus in the present invention is matched to the flow characteristics of the overflow downdraw sheet glass manufacturing process. For a given glass, the variation of the glass density in the fining process is a second order effect, thus the present invention considers primarily the glass viscosity and the seed cross-sectional area.

The finer configuration that is used in the embodiments of the present invention preferably has a high aspect ratio (high width to height ratio) to give increased fining performance as compared to the cylindrical finer used in the prior art. Examples of high aspect ratio finers are shown in U.S. Pat. No. 7,150,165 and U.S. Patent Publication 2007/0084247, which are incorporated herein by reference.

The present invention significantly modifies the prior art glass delivery system (10) from the glass melting furnace to the sheet forming apparatus to match it with the overflow downdraw process. The present invention includes a glass delivery system which homogenizes the glass, removes most of the seeds and blisters from the glass, and then distributes most of the remaining defects to the unusable inlet and distal edges of the glass sheet which is formed by the overflow downdraw process. Two important elements of the present invention are relocating the stirring device to the inlet of the finer and designing the finer so that defects caused by the finer end up in the unusable ends of the sheet. Unless otherwise indicated, in all of the embodiments, the stirring device is relocated to the inlet of the finer from the outlet of the finer.

To achieve the maximum benefits of this invention, the simultaneous use of all of the embodiments as a system is preferred; however, any of the individual embodiments may alternatively be used or implemented independently of each other. The actual production implementation of the embodiments of this invention would likely be in rational steps as change in a manufacturing environment is almost always cautious.

The description of the embodiments of this invention is made in an order that they might be implemented into the system and in an order that is easily described. Other orders for implementing, as well as use of the individual embodiments separately, are within the spirit of the present invention.

Figure 3:
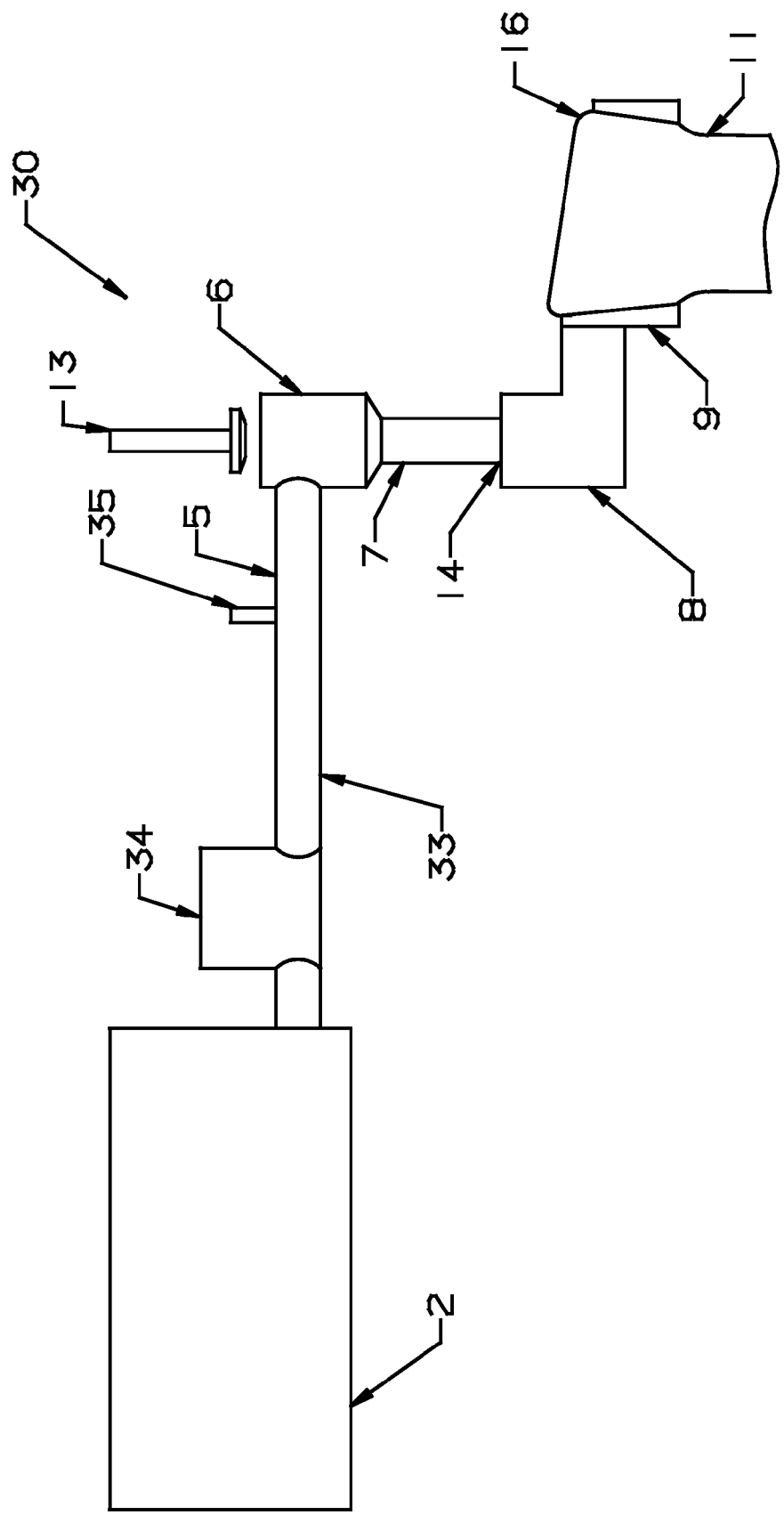
FIG. 3 shows the principle parts of "The Overflow Process" glass sheet manufacturing system in an embodiment of the present invention.

FIG. 3 represents an embodiment of a delivery system (30), where the stirring device (34) is relocated to the inlet of the finer from the outlet of the finer. The basic shape of the finer (33) is changed from a cylindrical shape to a shaped cross-section as shown in FIGS. 5, 9A through 9D, and 10A through 10D, whereby the apexes (57) of the finer contain the glass that will form the unusable inlet end of the glass sheet. The finer vents (35 and 55) are located at these apexes (57) such that any homogeneity defects caused by the vents are diverted to the unusable inlet end of the glass sheet.

Figure 4C:
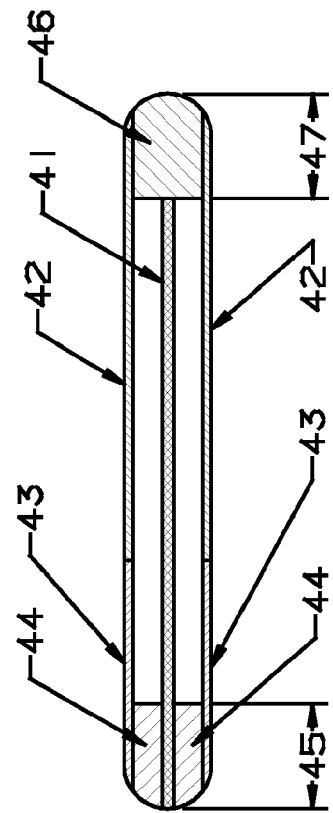
FIG. 4C shows a cross-section across lines C-C of FIG. 4A, where the glass flow in the downcomer pipe appears in the sheet for "The Overflow Process".
Figure 4B:
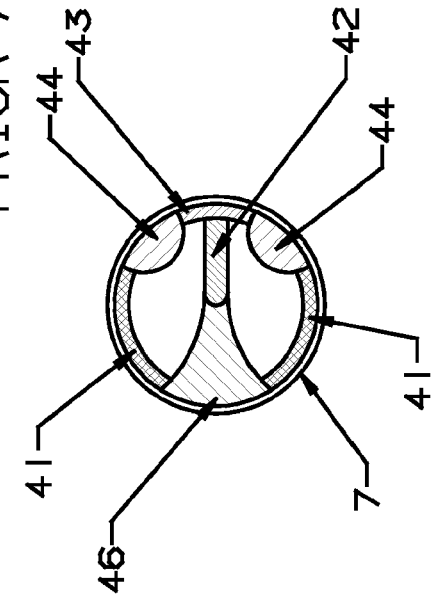
FIG. 4B shows a cross-section of the glass flow in the downcomer pipe across lines B-B of FIG. 4A.
Figure 4A:
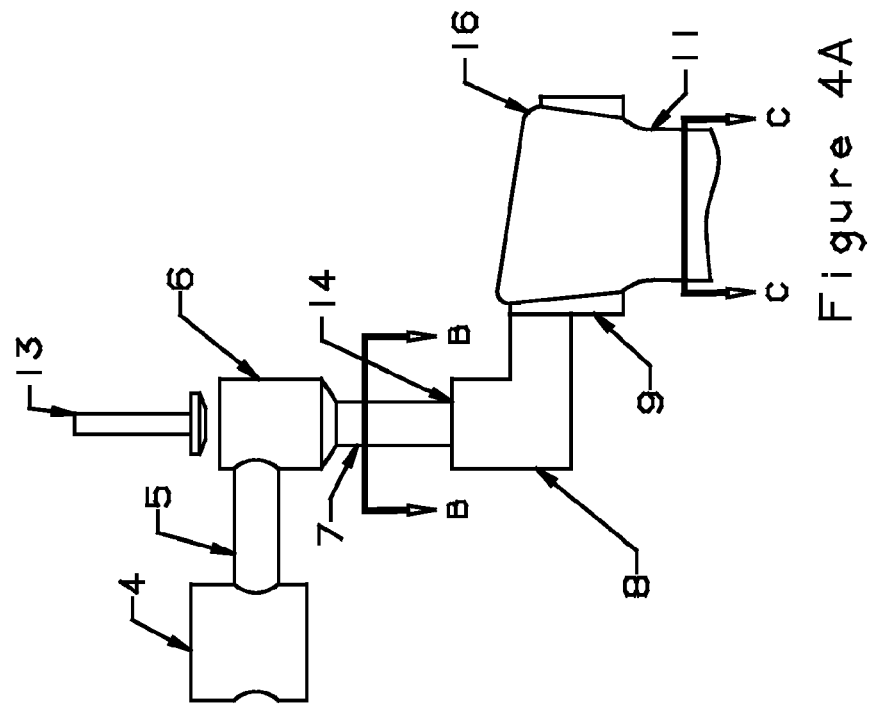
FIG. 4A shows a side view of "The Overflow Process" as known in the prior art.

FIGS. 4A through 4C illustrate where the glass (16) flowing in the downcomer feed pipe (7) ends up in the formed glass sheet in the prior art "Overflow Process". The glass flow (41) in proximity to the side surfaces of the downcomer pipe (7) as shown in FIG. 4B ends up forming the center of the drawn sheet as shown in FIG. 4C. The flow (43) in proximity to the front surface of the downcomer pipe (7) as shown in FIG. 4B is distributed over the entire glass surface; however, it is most concentrated on the approximately one third of the sheet at the inlet end as shown in FIG. 4C. This surface glass (43) is subject to disruption by the downcomer pipe surface and by the glass in the quiescent zones in the bowl (6) and at the downcomer pipe (7) to inlet pipe (8) connection (14). The surface of the remaining substantially two thirds of the sheet is formed from virgin interior glass (42) as shown in FIG. 4B. Two other portions of the glass flow (44) which are symmetrically offset from the front surface at an angle of approximately 45 degrees as shown in FIG. 4B end up forming the near end unusable edge section (45) at the inlet end of the sheet as shown in FIG. 4C. Another portion (46) centered at an angle of approximately 180 degrees proceeds as shown in FIG. 4B to the far end unusable edge section (47) as shown in FIG. 4C. The inlet end section (45) and the distal end section (47), as shown in FIG. 4C, includes the portions of the sheet which do not meet the thickness and flatness specifications and thus are not saleable. In this invention, the design of the delivery system, primarily the finer, is such that the homogeneity defects and a large portion of the remaining seed defects are diverted to these end sections.

Figure 5:
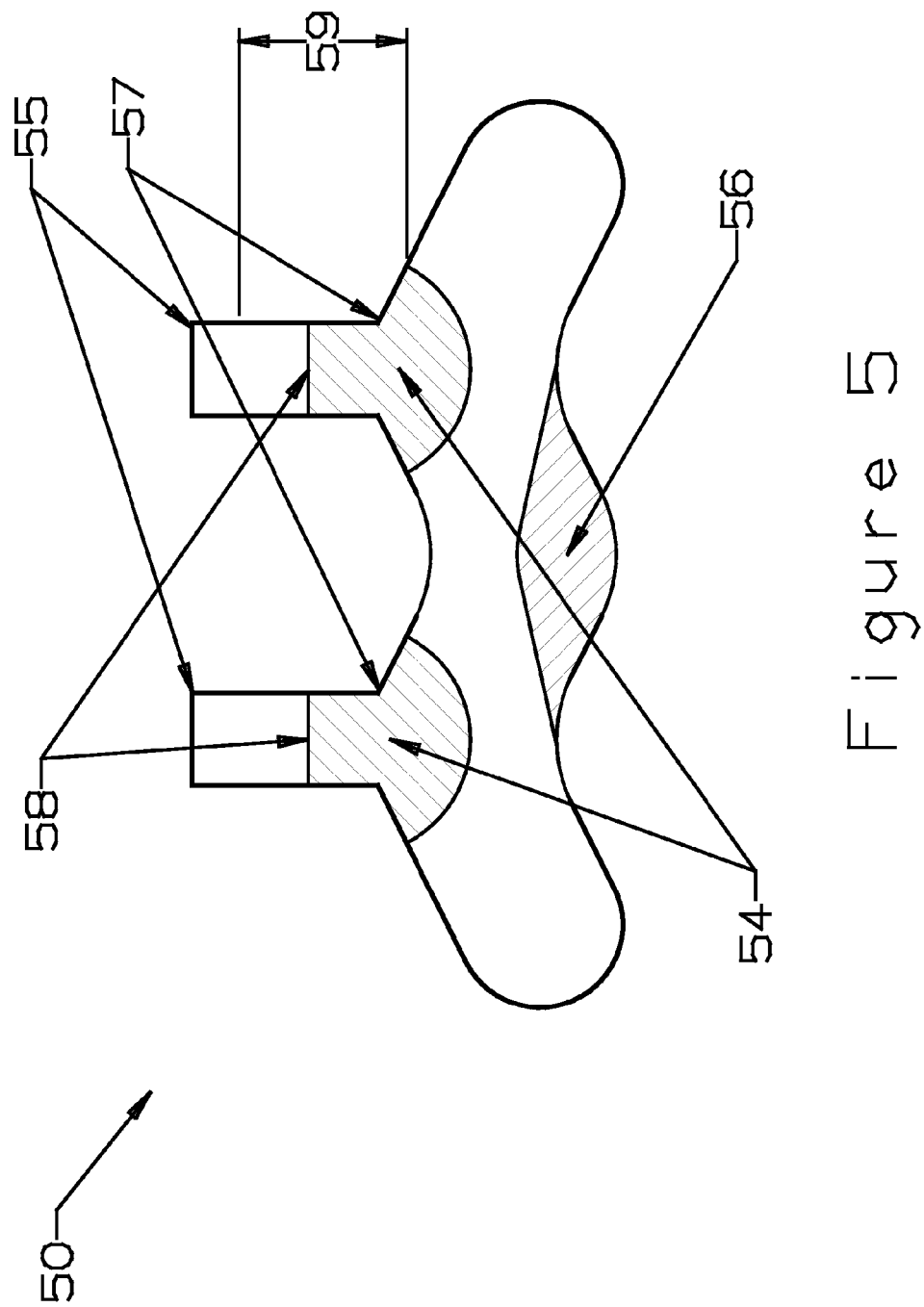
FIG. 5 shows a cross-section of a Double Apex finer at the location of atmospheric vents and the location of the glass that flows to the inlet and distal edges of the sheet.

FIG. 5 shows the cross-section (50) of a Double Apex (or Gull Wing shaped) finer at the finer vents (55) in an embodiment of the present invention. The finer vents (55) may be vented directly to the factory atmosphere or vented filter and/or vacuum system. This finer has a high width to height ratio to give increased fining performance as documented in U.S. Pat. No. 7,150,165 and U.S. Patent Publication No. 2007/0084247. The finer vents (55) are located at the apexes (57) of the finer cross-section. The dimensions of the finer and delivery system are such that the glass in the areas (54) that flows past these apexes (57) is the glass that will flow to the area (44) as shown in FIG. 4C of the formed sheet (11). Any glass inhomogeneities that are caused by the finer vents to the glass in the areas (54) thus end up in the area (44), the unusable inlet end of the glass sheet. Also, seeds which have risen to the area (54), the proximity of the finer vents (55), but are not trapped by the vents (55), will also flow to the area (44) in the formed sheet. The free surface (58) of glass in the finer is shown located in the vent above the apex (57). The vertical position of the free surface (58) may vary over a distance (59) without affecting the intended performance of this invention.

Figure 6:
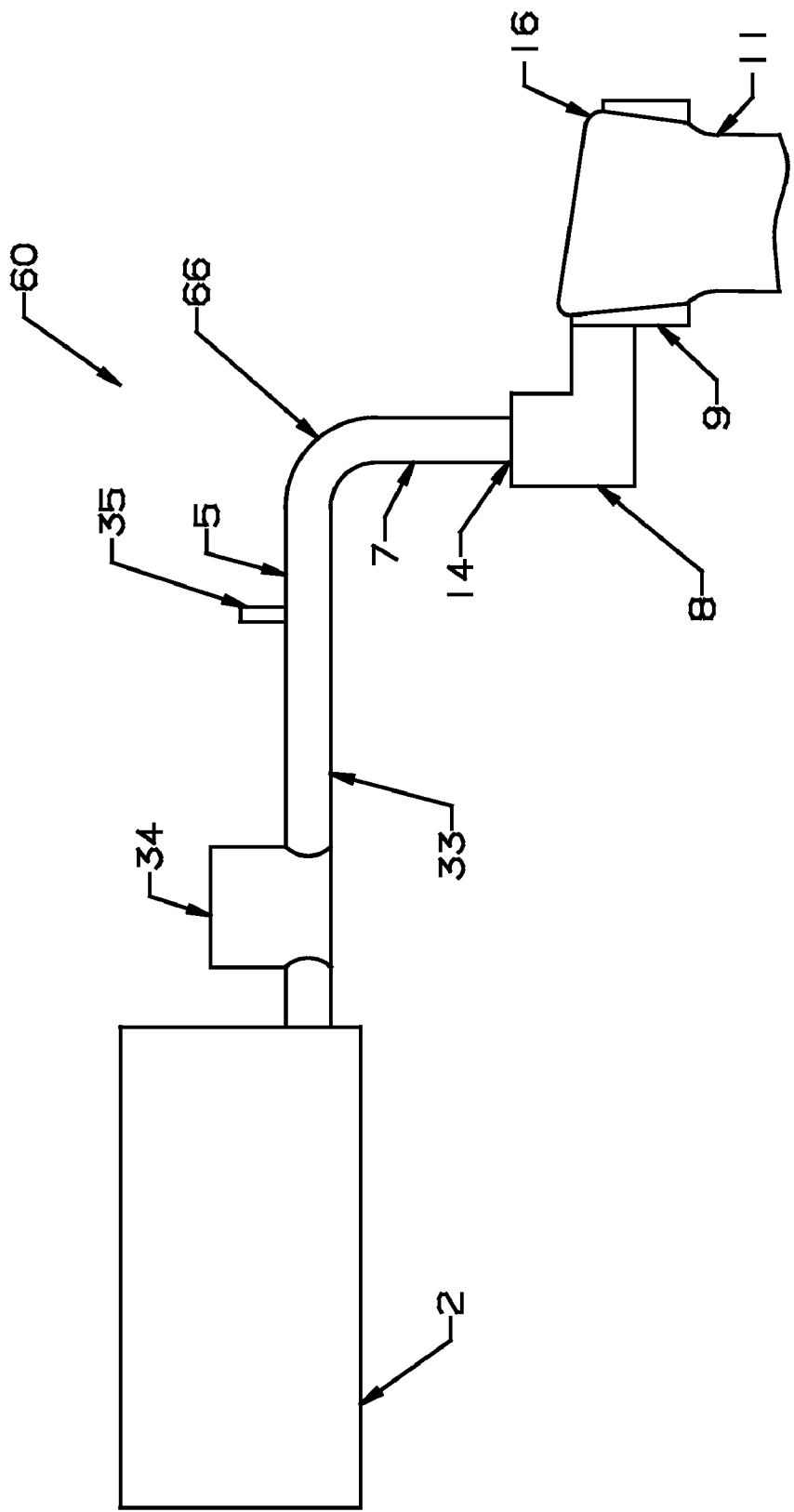
FIG. 6 shows the principle parts of "The Overflow Process" glass sheet manufacturing system in an embodiment of the present invention.

FIG. 6 shows another embodiment of a delivery system (60) of the present invention where the bowl (6) in the prior art is replaced by a transition section (66). The transition section (66) insures smooth glass flow from the cooling and conditioning pipe (5) to the downcomer pipe (7) and thus there is no free surface in the transition section (66). There is a glass free surface in the finer vent (35), which replaces the free surface normally in the bowl (6). A glass free surface is important for the stabilization of flow in the downcomer pipe (7).

FIG. 7A shows another embodiment of a delivery system (70) of the present invention where the finer (73) exits from the bottom portion of the stirring device (34) with a formed section (77) and the finer (73) has no vent. This finer is designed for use with glasses that generate few seeds during the melting process, such as the glass described in U.S. Patent Publication 2006/0293162, herein incorporated by reference. The seeds that are produced in the melting of the glass will rise to the area (54) at the apexes (57) of the finer as shown in FIG. 5 and flow to the area (44) of the formed sheet as shown in FIG. 4C.

FIG. 7B is a section through the center of the stirring device (34) and shows two stirrers (71 and 72). The molten glass (16) from the melting furnace (2) flows into the stirring device (34)

at the entrance (78), vertically upward past the rotating stirrer (71) forming the free surface (75), over the top of the weir (74), and then vertically downward past the rotating stirrer (72), then exiting the stirring device (34) into the finer (73).

In the prior art, the downcomer pipe (7) is the primary resistance to glass flow through the delivery system (10) to the overflow process. Temperature control of the glass in the downcomer controls the glass flow. There is heating means, primarily electric, in the downcomer pipe (7), which controls the glass viscosity distribution in the downcomer pipe (7). There is a glass free surface in the bowl (6), which determines the static pressure distribution in the downcomer pipe (7). Improved methods for controlling glass flow are discussed in U.S. Patent Publication No. 2006/0016219, which is incorporated herein by reference.

In the embodiment of the delivery system (70) in FIG. 7A, the stirring device has a free surface (75), but there is no free surface in the finer (73), the cooling and conditioning pipe (5), or the transition pipe (66) downstream of the stirring device. A free surface is an important element in the control of glass flow. The glass flow in this embodiment (70) is much more a function of the temperature distribution in the finer (73), the cooling and conditioning pipe (5), and the transition pipe (66) than in the prior art. This can cause sluggish response (low bandwidth) in the control of glass flow. To overcome the sluggish response, the static pressure in the delivery system is controlled by the pumping action of the stirring device (34).

Most stirrer designs have a pumping action. U.S. Pat. No. 6,763,684 is an example and is incorporated herein by reference. FIG. 7B is a section through the stirring device (34) in FIG. 7A showing two stirrers (71 and 72). In this embodiment, the rotational speed of the stirrers (71 and 72) is used to alter the hydrostatic pressure in the delivery system. The stirrers (71 and 72) may be either the same or different in design and rotate in either the same or opposite directions.

For the purpose of explanation, consider that there are two identical stirrers (71 and 72), which rotate in the same direction. The stirrers (71 and 72) are designed to produce moderate pumping action (approximately 25 to 250 mm of glass, assume 100 mm of glass for this example) at the design rotational speed. The pumping action is measured as a difference between the height of the glass free surface (75) when a stirrer is rotating versus the height of the glass free surface (75) when a stirrer is not rotating. When the stirrers (71 and 72) are stationary, the hydrostatic pressure in the molten glass (16) at the inlet (78) of the stirring device (34) is slightly higher than the hydrostatic pressure in the molten glass (16) at the finer inlet (73) because of the pressure loss due to Newtonian fluid flow. The molten glass (16) passes up through stirrer (71), which rotates to increase hydrostatic pressure, and the glass passes down through stirrer (72), which, rotating in the same direction as stirrer (71), decreases hydrostatic pressure. When the stirrers are rotating, the hydrostatic pressures at the inlet (78) of the stirring device (34) and the finer inlet (73) are still substantially the same, but the free surface (75) of the glass in the stirring device chamber (34) is higher by 100 mm (the design pumping action) than when the stirrers are stationary. If it is determined that the glass flow has decreased, a rapid increase in the flow to the predetermined value may be obtained by increasing the hydrostatic pressure at the finer inlet (73). This is accomplished by increasing the rotational speed of the stirrer (71) and decreasing the rotational speed of the stirrer (72). A 5% change in rotational speed of each stirrer will produce a 10% change (10 mm of glass) in static pressure at the finer inlet (73). The homogenization of the glass will remain approximately the same as there will be approximately a 5% increase in mixing by the stirrer (71) and approximately a 5% decrease in mixing by the stirrer (72).

The pumping stirrer speed change strategy for controlling glass flow rate is directly applicable to the prior art configuration shown in FIG. 1 with no other components of this invention. In an implementation of the delivery system which has a free surface in the bowl, changing the relative speeds of the stirrers as described above would increase the level of the free surface in the bowl, thus increasing the hydrostatic head for flow in the downcomer pipe. The stirring device control action as applied to either an embodiment of this invention or to the prior art increases the flow control bandwidth. It would be used to correct flow errors until stable thermal control is restored, at which time the stirrer rotational speeds would return to normal.

In many industrial processes an auger type device is used to mix or pump liquid or slurry material. The stirring device in the delivery system of the present invention preferably includes one or more augers, or stirrers. At the outflow tip of the stirring device is a region of vortex flow, which does not readily mix with the main process stream. The material partially trapped in this region typically has different material and/or physical characteristics than the main process stream and is not homogeneous with the material in the process stream. When this material mixes with the process stream, the defect in the product caused by this inhomogeneous material that flows from the tip of an auger, or stirrer, is known as auger spot.

Referring to FIG. 7B, the formed section (77) is designed such that the inhomogeneous glass (76), which flows from the tip (79) of the stirrer (72), flows through an area (56) in the finer (50) as shown in FIG. 5 and thus flows to an area (46) at the distal end of the formed sheet as shown in FIG. 4C. Therefore, the glass from the tip (79) of the stirrer (72) does not cause a defect in the salable portion of the glass sheet.

This embodiment may be used with a stirring device (34) located at either the inlet end of the finer (33), (73) in an embodiment of the invention or the distal end of the finer (3) in the prior art. Relocating the stirring device (34) to the inlet end is preferred.

FIG. 7C is a section through the center of the stirrer (72) showing the shape of the formed section (77) relative to the tip (79) of the stirrer (72). The glass that flows in proximity to the walls of the delivery system is subject to the development of inhomogeneities; including composition gradients (cord), seeds, and, in the case of tin fined glass, platinum particles. The tin in the glass, which is used as a fining agent, reduces platinum, thus producing platinum particles. Platinum has a higher density than the glass, which normally would cause the particles to drift to the bottom of the delivery system due to gravitational forces; however, any platinum particles which have a high surface area to volume ratio will continue to flow in proximity to the delivery system walls. Referring back to FIG. 4B, those particles that flow in proximity to the wall in the areas (41) and (43) will end up in the formed sheet in the corresponding areas as shown in FIG. 4C.

U.S. Pat. No. 6,889,526 discusses ways to divert the flow in area (43) in FIG. 4B to the unusable end section (45) shown in FIG. 4C and is incorporated herein by reference. U.S. Pat. No. 6,895,782 discusses ways to divert the flow in areas (41 and 43) in FIG. 4B to the unusable ends sections (45 and 47) shown in FIG. 4C and is also incorporated herein by reference.

FIGS. 8A through 8C show another embodiment of the present invention, which may be incorporated in any or all of the delivery system embodiments (10, 30, 60 and 70). This embodiment includes a set of flow baffles (81 and 83) at the exit end of the downcomer pipe (7). The top surface of these baffles (81 and 83) is angled to the internal surface of the downcomer pipe (7) at an angle (82). Angle (82) varies from −10 to 45 degrees. A comparison of FIGS. 4B and 8B shows that the flow baffles (81 and 83) as shown in FIG. 8B are located at the same angular location in the downcomer pipe (7) as glass flows (41 and 43) and thus divert the glass flow in these regions into the regions (44 and 46) of the downcomer pipe (7) as shown in FIG. 4B. These flow baffles (81 and 83) are another technique for diverting the glass flow from the areas (41 and 43) in FIG. 4B to the unusable ends sections (45 and 47) shown in FIG. 4C. This embodiment may be used with the stirring device located at either the inlet end of the finer in an embodiment of this invention or the distal end of the finer as in the prior art.

Figure 9B:
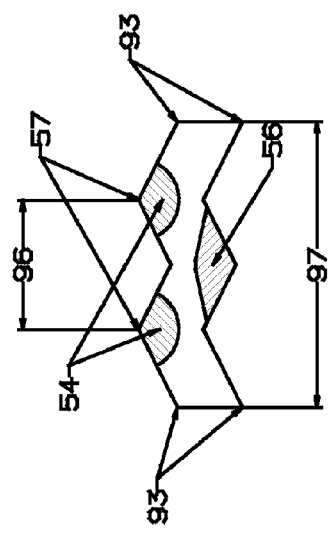
FIG. 9B shows a high aspect ratio dual apex finer cross-section with sharp corners in an embodiment of the present invention.
Figure 9D:
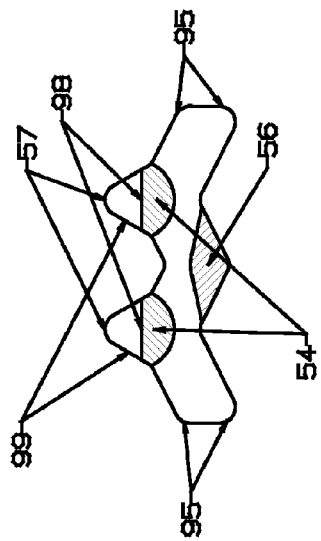
FIG. 9D shows a high aspect ratio dual apex finer cross-section with modest corner radii and an extended vent cross-section with an internal free surface in an embodiment of the present invention.
Figure 9A:
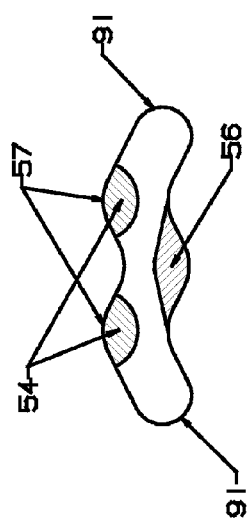
FIG. 9A shows a high aspect ratio dual apex finer cross-section with generous corner radii in an embodiment of the present invention.
Figure 9C:
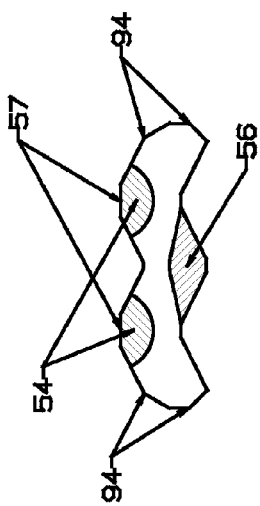
FIG. 9C shows a high aspect ratio dual apex finer cross-section with chamfered corners in an embodiment of the present invention.

FIGS. 9A through 9D show various embodiments of the dual apex finer cross-section in a shape termed "Gull Wing" herein. The embodiment in FIG. 9A is the same cross-section as shown in FIG. 5, but not at the finer vent. The end corners have generous full radii (91) between the straight sections. The embodiment in FIG. 9B has the same overall shape, but the corners (93) are shaped with no radii or chamfers between the straight sections. The embodiment in FIG. 9C has chamfered corners (94) in between the straight sections. The embodiments in FIG. 9A, 9B, and 9C are shown to have no free surface in the cross-section. The embodiment in FIG. 9D has smaller radii (95) at the ends and free surface sections (99) at the apexes (57). The free surface section (99) is an extension of the vent back toward the stirring device a distance (112), as shown in FIGS. 11A and 11B. This provides for a larger area of the glass free surface (98). The free surface (98) length (112) may be the entire length of the finer if desired. It may even extend into the cooling and conditioning section (5). Referring to FIG. 9B, the ratio of the overall width (97) of the finer to the width (96) between the apexes (57) of the finer is between 1.15 and 2.25. In a preferred embodiment, this width ratio is between 1.25 and 1.75.

Figure 10B:
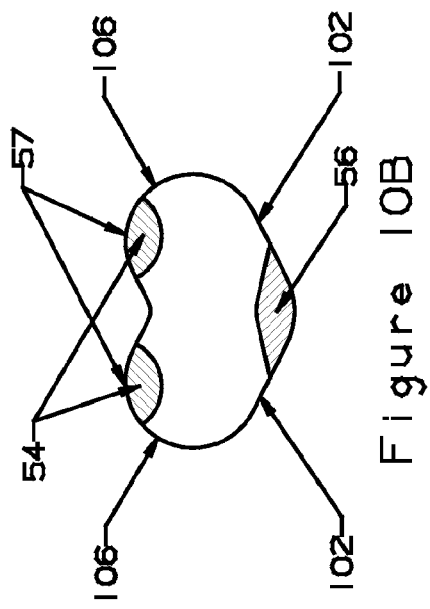
FIG. 10B shows a low aspect ratio dual apex finer cross-section with generous corner radii and a V shaped bottom in an embodiment of the present invention.
Figure 10D:
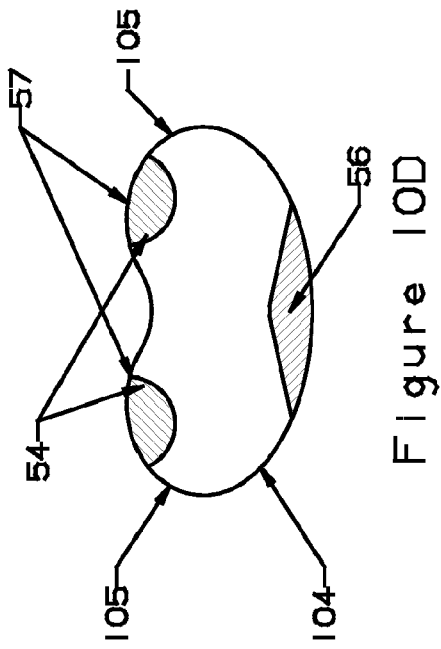
FIG. 10D shows an elliptical finer cross-section modified to a dual apex configuration in an embodiment of the present invention.
Figure 10A:
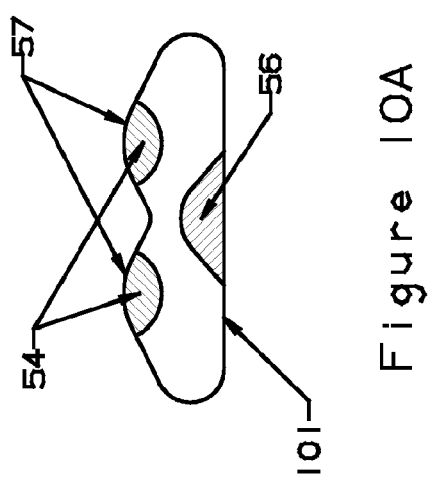
FIG. 10A shows a high aspect ratio dual apex finer cross-section with generous corner radii and a flat bottom in an embodiment of the present invention.
Figure 10C:
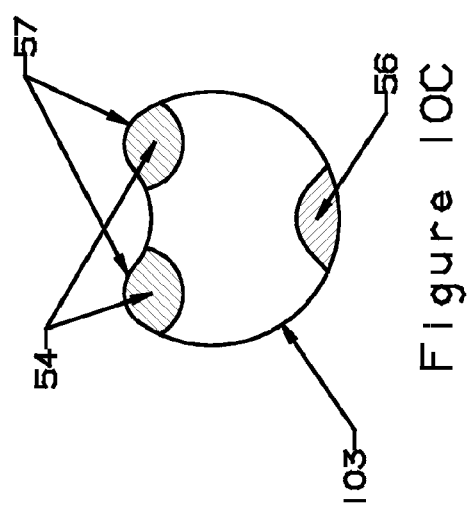
FIG. 10C shows a cylindrical finer cross-section modified to a dual apex configuration in an embodiment of the present invention.

FIGS. 10A, 10B, 10C, and 10D show additional embodiments of the dual apex finer cross-section. The embodiment in FIG. 10A is the same as FIG. 9A but with a flat bottom (101). The embodiment in FIG. 10B has bottom sections (102), which form a V shape and generous end radii (106). An advantage of this embodiment is that any heavy particles in the glass will migrate to the section (56), which will form the unusable distal edge of the sheet. This would be useful if large platinum particles are the result of tin, in a tin refined glass, reducing the platinum walls of the delivery system. The embodiment in FIG. 10C is a dual apex modification to a cylindrical prior art finer. The bottom is circular (103) and the apexes are formed by smaller radii. This embodiment would have a large part of the structural integrity of the cylindrical shaped finer, but would not have the refining efficiency of a flat finer. The embodiment in FIG. 10D is an elliptical shaped dual apex finer. The bottom (104) is a large ellipse and the two apexes (57) are formed by two smaller ellipses (105) radiused together. This finer would have a higher fining efficiency than the dual apex cylindrical finer in FIG. 10C. The ratio of finer cross-sectional area to finer height is indicative of the relative fining performance of a finer design. The larger the area for flow, the slower the molten glass moves through the finer, allowing more time for the seeds to rise. The lower the height of the finer, the less distance the seeds must rise. The ratio of the two parameters creates an additional parameter termed "performance ratio" herein. The higher the performance ratio, the more efficiently the finer removes the seeds. The performance ratio is a figure of merit, not an exact determination of performance, especially when the finer cross-sectional shapes become more complex.

FIGS. 20 through 29 show various finer cross-sections taught in U.S. Pat. No. 7,150,165 and U.S. Patent Publication 2007/0084247. The shapes of the cross-sections in FIG. 27A through 27H all have the same perimeter, therefore the cost of construction is substantially equal. Table 1 shows the height, width, cross-sectional area, width to height ratio (aspect ratio) and performance ratio for each cross-sectional shape.

TABLE 1

| FIG. | Height | Width | Aspect Ratio | Area | Performance Ratio |
|------|--------|-------|--------------|------|-------------------|
| 27A  | 0.3183 | 0.3183 | 1.00 | 0.0796 | 1.00 |
| 27B  | 0.1497 | 0.4489 | 3.00 | 0.0528 | 1.41 |
| 27C  | 0.2500 | 0.2500 | 1.00 | 0.0625 | 1.00 |
| 27D  | 0.1250 | 0.3750 | 3.00 | 0.0469 | 1.50 |
| 27E  | 0.1367 | 0.4102 | 3.00 | 0.0529 | 1.55 |
| 27F  | 0.1400 | 0.4200 | 3.00 | 0.0546 | 1.56 |
| 27G  | 0.1396 | 0.4188 | 3.00 | 0.0545 | 1.56 |
| 27H  | 0.1383 | 0.4148 | 3.00 | 0.0547 | 1.58 |

The perimeter of all of the shapes is the same, normalized to 1.00 unit of distance, thus the comparisons in Table 1 are between shapes with the same cost of raw materials. In order to simplify the comparisons between the performance ratios (cross-sectional area divided by height) of the various shapes, the performance ratio of the prior art cylindrical finer (FIG. 27A) has been adjusted to 1.00. This was done by multiplying the area divided by the height by a factor of four.

Figure 27A:
FIG. 27A shows a cylindrical cross-section of a finer as known in the prior art.

FIG. 27A shows the cylindrical cross-section as known in the prior art. The cylindrical finer has an aspect ratio of 1.00 and a performance ratio of 1.00. In contrast, the cross-sectional shape of the finer of the present invention preferably has a width to height ratio (aspect ratio) substantially greater than 1.00. The aspect ratio of the finer is preferably 1.50 or greater. In a preferred embodiment, the aspect ratio of the finer is approximately 3.00. In another preferred embodiment, the aspect ratio of the finer is approximately 6.00.

Figure 27B:
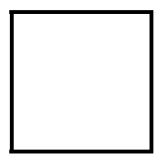
FIG. 27B shows an elliptical cross-section of a finer in an embodiment of the present invention.
Figure 27E:
FIG. 27E shows a rectangular with chamfered sides cross-section of a finer in an embodiment of the present invention.

FIG. 27B shows an elliptical cross-section of a finer of the present invention, with an aspect ratio of 3.00. Its performance ratio is 1.41, which means that it removes seeds more quickly than the cylindrical cross-section of FIG. 27A.

FIG. 27C shows a square cross-section of a finer. Since its performance ratio is 1.00, it removes seeds with approximately the same efficiency as the finer with the cylindrical cross-section in FIG. 27A.

FIG. 27D shows a rectangular cross-section of a finer of the present invention. This finer has an aspect ratio of 3.00 and a performance ratio of 1.50. This finer removes seeds substantially quicker than the finer with the cylindrical cross-section, shown in FIG. 27A, or the finer with the square cross-section, shown in FIG. 27C.

Figure 27G:
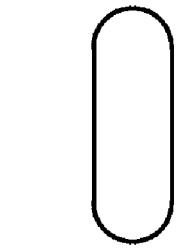
FIG. 27G shows a rectangular with curved sides and an arced top and bottom cross-section of a finer in an embodiment of the present invention.
Figure 27H:
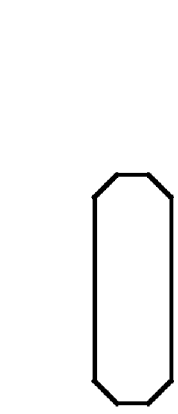
FIG. 27H shows a cross-sectional shape similar to FIG. 4G, except the top and bottom surfaces are not parallel.

FIGS. 27E, 27F, 27G and 27H are various embodiments of a finer with a substantially rectangular cross-section. All of these embodiments have an aspect ratio of 3.00. The finer in FIG. 27E has a rectangular cross-section with sides, or corners, which are preferably chamfered or curved. FIG. 27F shows a rectangular cross-section with rounded or curved sides. FIG. 27G shows a rectangular cross-section with rounded or curved sides and an arced top and bottom. This design increases structural rigidity. FIG. 27H is similar to the shape of FIG. 27G, except that its top (278) and bottom (279) surfaces are not parallel. The flow velocity at the center of the parallel top (278) and bottom (279) surfaces in FIG. 27G is slightly faster than at the sides (271). The cross-section in FIG. 27H has a bottom surface (279), which is arced more than the top surface (278), making the vertical distance (270) at the center slightly less. This altered cross-section both slows the relative velocity of the glass at the center and decreases the distance that seeds must rise. This equalizes the fining performance over a greater percentage of the width of the finer.

FIG. 28A through 28H and FIG. 29A through 29H show additional finer shapes that provide increased fining capability. In FIGS. 28A through FIGS. 28H, the top of the finer has a gabled roof shape that has an apex or ridge (283) with an obtuse included angle (280) to allow the seeds to migrate to the center of the finer where they will more easily be dissipated at the atmospheric vent. In some embodiments of this invention, the migration of the seeds to the apex (283) of the finer is enhanced by narrow fining ribs (296) attached to the top surfaces (281) of the finer. These fining ribs (296) also provide structural reinforcement of the finer top surface (281).

Figures 28A, 28B:
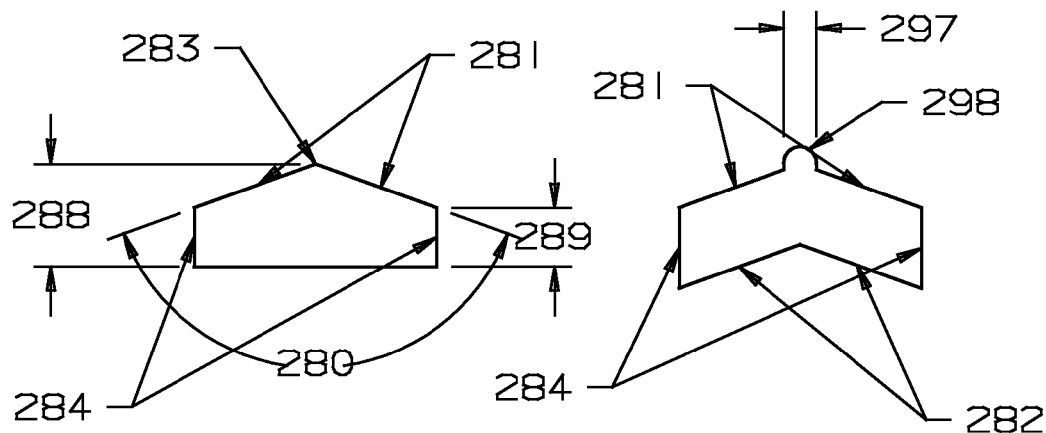
FIG. 28A shows a five sided gable roof finer cross-section in an embodiment of the present invention.
FIG. 28B shows a six sided gable roof finer cross-section in an embodiment of the present invention.
Figures 28C, 28D:
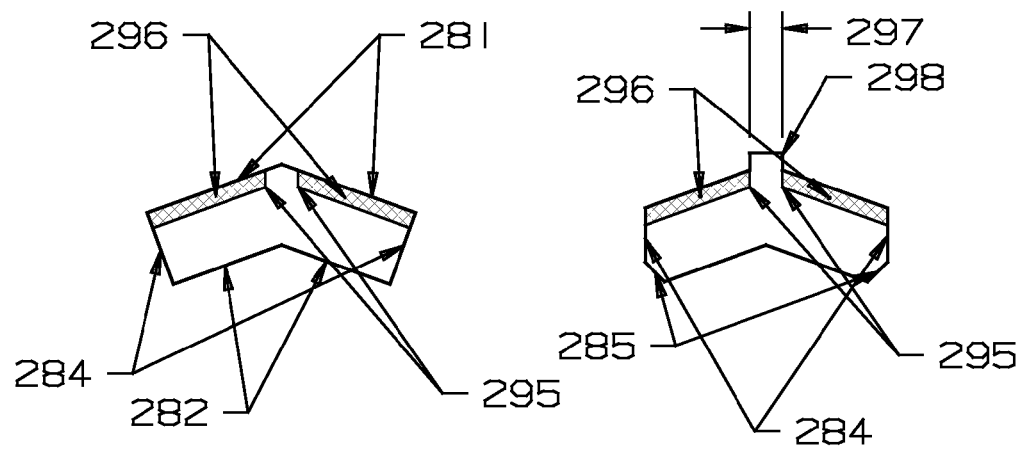
FIG. 28C shows a six sided gable roof finer cross-section with fining ribs in an embodiment of the present invention.
FIG. 28D shows a six sided gable roof finer cross-section with fining ribs and chamfered ends in an embodiment of the present invention.
Figure 28E:
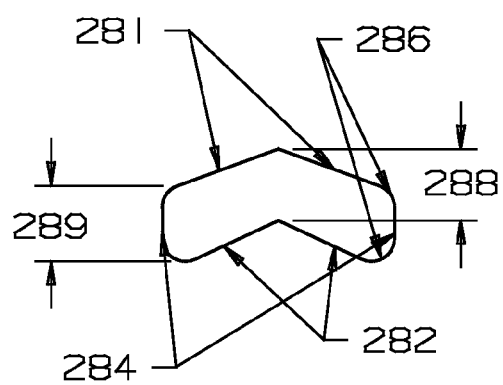
FIG. 28E shows a six sided gable roof finer cross-section with radii at the ends in an embodiment of the present invention.
Figure 28F:
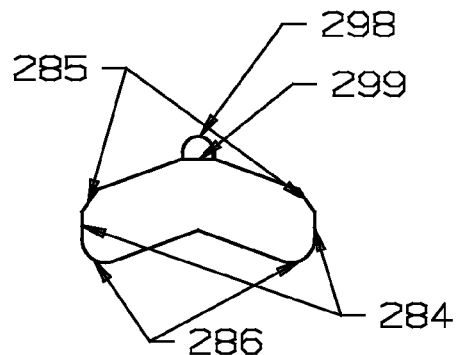
FIG. 28F shows a six sided gable roof finer cross-section with radii and chamfers at the ends in an embodiment of the present invention.
Figure 28G:
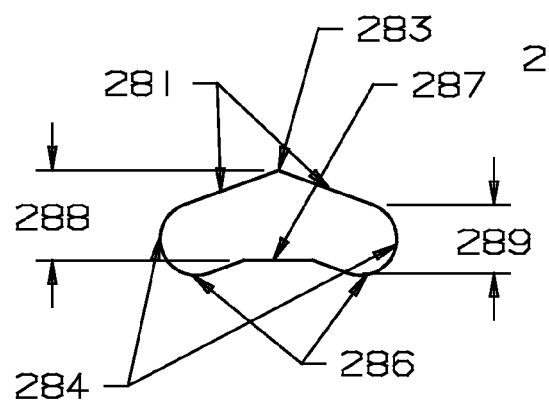
FIG. 28G shows a seven sided gable roof finer cross-section with radii at the ends in an embodiment of the present invention.
Figure 28H:
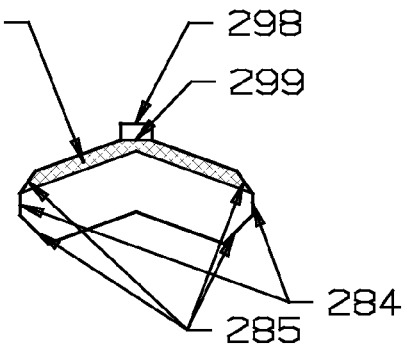
FIG. 28H shows a six sided gable roof finer cross-section with fining ribs and chamfered ends in an embodiment of the present invention.

FIG. 28A shows a finer cross-section that is pentagonal with a sloped gabled roof (281), which has an obtuse angle (280) at its center (283). The sides (284) of the cross-section are parallel. As the obtuse included angle (280) approaches 180 degrees, the general shape is substantially rectangular. The height at the center (288) is greater than the height at the ends (289). FIG. 28B shows a finer cross-section with six sides where the tops (281) and opposite bottoms (282) are parallel and the ends (284) are parallel. A roof vent (298) of width (297) is also provided. FIG. 28C shows a finer cross-section with six sides where the tops (281) and opposite bottoms (282) are parallel and the ends (284) are perpendicular to the tops and bottoms. Fining ribs (296) with a center opening (295) are also shown. FIG. 28D shows the cross-section of FIG. 28B with single chamfers (285) at the ends (284). Fining ribs (296) with a center opening (295) are also shown. A roof vent (298) of width (297) is also provided. FIG. 28E has six sides and radiused (286) ends (284), where the top radii (286) and the bottom radii (286) are of different sizes. The tops (281) and the bottoms (282) of FIG. 28E are not parallel and the bottoms (282) are angled such that the height (288) at the center (283) is less than the height (289) at the ends (284). FIG. 28F shows the cross-section of FIG. 28B with chamfered (285) top ends and radiused (286) bottom ends (284). A roof vent (298) is also provided. FIG. 28G shows the cross-section of FIG. 28C with fully radiused (286) ends (284). FIG. 28G also has a horizontal bottom section (287) such that the height (288) at the center is greater than the height (289) at the ends (284). FIG. 28H shows the cross-section of FIG. 28D with chamfered (285) ends (284), where the chamfers are of different sizes. A roof vent (298) is also provided.

In FIGS. 29A through 29H, the top of the finer has a gothic arch shape (291), which has an apex (283) to allow the seeds to migrate to the apex (283) of the finer where they will more easily be dissipated at the atmospheric vent. In some of the preferred embodiments of this invention, the migration of the seeds to the apex (283) of the finer is enhanced by narrow ribs (296) attached to the top surfaces (291) of the finer. These fining ribs (296) also provide structural reinforcement of the finer top surface (291).

The gothic arch shape (291) is a structural improvement over the straight sided top surfaces (281) of FIGS. 28A through 28H. At the high temperature of operation, a straight sided unsupported platinum roof (281) of the finer has the tendency to deform. In contrast, a gothic arch (291) has a natural structural stiffness that resists deformation. A finer, where there is no internal glass free surface, would primarily have a deformation problem during start-up conditions because, once the finer is full of glass, the hydrostatic head of the glass in the finer provides a force to make the platinum press against the refractory backing material. The deformation of the top surface (281) and (291) is most critical for a finer where the glass has an internal glass free surface.

Figures 29A, 29B:
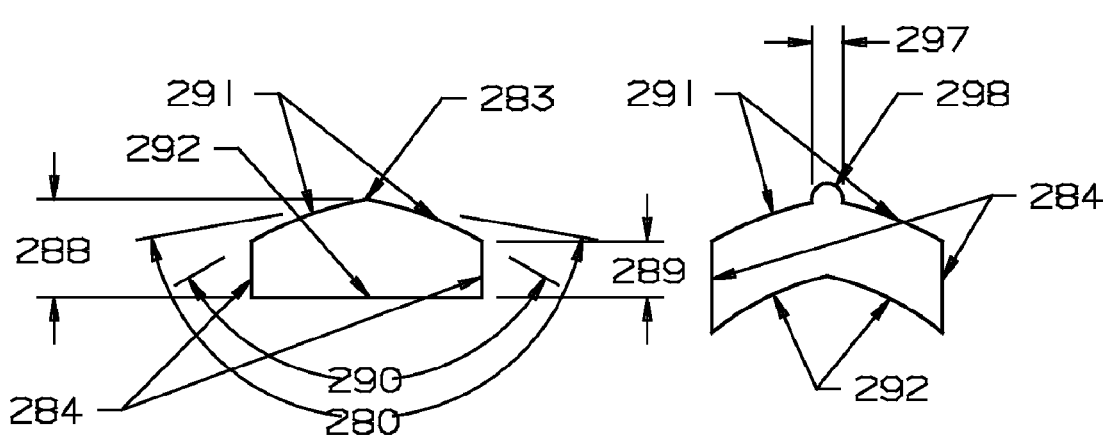
FIG. 29A shows a five sided Gothic arch roof finer cross-section in an embodiment of the present invention.
FIG. 29B shows a six sided Gothic arch roof finer cross-section in an embodiment of the present invention.
Figures 29C, 29D:
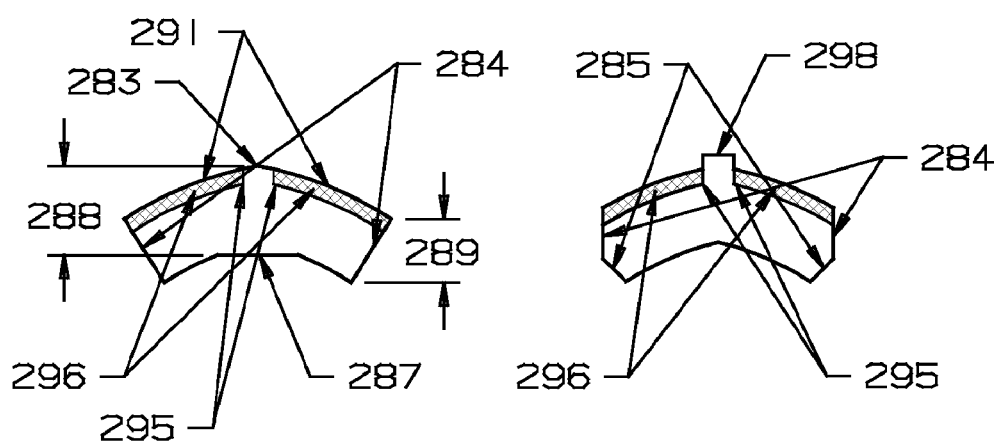
FIG. 29C shows a seven sided Gothic arch roof finer cross-section with fining ribs in an embodiment of the present invention.
FIG. 29D shows a six sided Gothic arch roof finer cross-section with fining ribs and chamfered ends in an embodiment of the present invention.

The top surfaces (291) in FIG. 29A have the shape of a gothic arch with an obtuse included angle (280) at the apex or ridge (283), an obtuse included angle (290) at the ends (284), a flat bottom (292), and parallel ends (284). FIG. 29B has top surfaces (291) the shape of a gothic arch with the bottom surfaces (292) having a contour which is equidistant from the top surfaces (291), parallel ends (284) and an apex vent (also called a ridge vent (298)) of width (297) at the apex (283). FIG. 29C has top surfaces (291) the shape of a gothic arch with the bottom surfaces (292) having a contour which is equidistant from the top surfaces (291) and ends (284) that form a right angle with the bottom surfaces (292). FIG. 29C also has a horizontal bottom section (287) such that the height (288) at the center is greater than the height (289) at the ends (284). Fining ribs (296) with a center opening (295) are also shown. FIG. 29D shows the cross-section of FIG. 29B with single chamfers (285) at the ends (284). Fining ribs (296) with a center opening (295) and an apex vent (298) are also shown. FIG. 29E has top surfaces (291) the shape of a gothic arch with a contoured bottom surface (292) which has a vertical distance (288) from the apex (283) which is less than the height (289) at the ends (284) and has radiused ends (286) of different radii. FIG. 29F shows the cross-section of FIG. 29B with chamfered (285) top ends and radiused (286) bottom ends (284). FIG. 29G shows the cross-section of FIG. 29C with fully radiused (286) ends (284). FIG. 29H shows the cross-section of FIG. 29D with chamfered (285) ends (284) where the chamfers are of different sizes. In FIG. 29H, fining ribs (296) without a center opening and an apex vent (298) with width (297) are also shown.

FIGS. 28F, 28H, 29F, and 29H show a structural element (299) connecting the top surfaces (281). This structural element maintains the apex vent at a constant width (297). In a preferred embodiment, the structural elements (299) are webs with the web surfaces parallel to the direction of glass flow. The webs (299) are spaced at intervals along the apex (283) to provide the required structural strength. In another preferred embodiment the webs extend the distance between the fining ribs (296), but have openings at the fining ribs to allow the seeds to move from the fining rib (296) into the apex vent (298). In another preferred embodiment, the structural elements are struts spaced along the apex (283) at intervals to provide the required structural strength.

The fining ribs (296) shown in FIGS. 28C, 28D, 28H, 29C, 29D, and 29 H trap seeds moving in the direction of glass flow along the top surfaces (281) of the finer. The fining ribs (296) are a specific configuration of a baffle. The fining ribs are attached primarily to the top surfaces (281) of the finer and extend down from the top surface approximately 5 to 40 percent of the height (288) of the finer. In addition to trapping seeds, they also provide structural reinforcement to the top surface of the finer. The seeds that are trapped agglomerate into larger seeds and then migrate by buoyant force toward the ridge or apex (283). In FIGS. 28C, 28D, 29C, and 29D, the fining rib is shown as ending at the edge (295) of the roof vent (298) where the seeds rise into the roof vent (298) and migrate in the direction of glass flow to the atmospheric vent at the outlet end of the finer. In FIGS. 28H and 29H, the fining rib (296) extends across the apex (283) of the finer and provides structural stiffness in the manner of the structural element (289). The top of the fining rib (295) is open to the apex vent (298) such that the seeds rise into the roof vent (298) and migrate in the direction of glass flow to the atmospheric vent at the outlet end of the finer.

The apex vents (298) shown in FIGS. 28B, 28F, 29B, and 29F have a radiused cross-section, whereas the apex vents (298) shown in FIGS. 28D, 28H, 29D, and 29H have a rectangular cross-section. The cross-section may alternatively be triangular, trapezoidal, or pentagonal, etc. with radiused or chamfered corners. The apex vent (298) works in combination with the fining ribs (296) to allow the easy migration of seeds, which have moved to the apex (283) area through the action of the fining ribs (298), to the vent at the exit end of the finer.

Figure 20A:
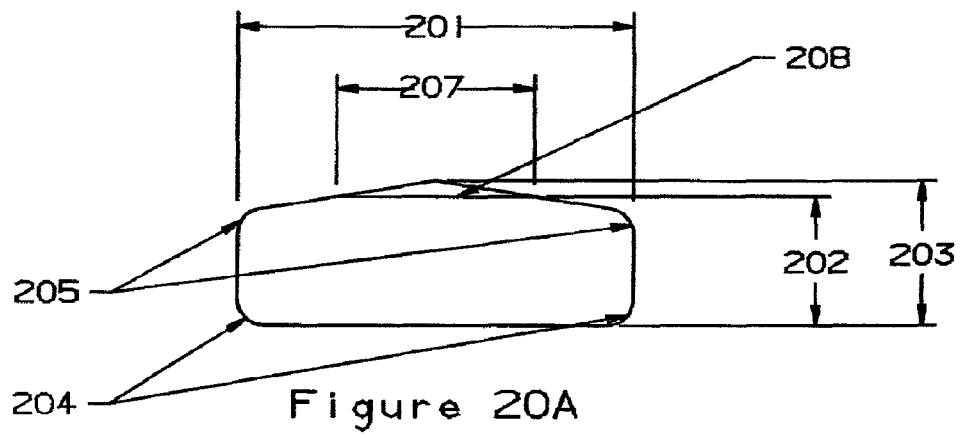
FIG. 20A shows one use of radii in a high aspect ratio enclosed finer.
Figure 20B:
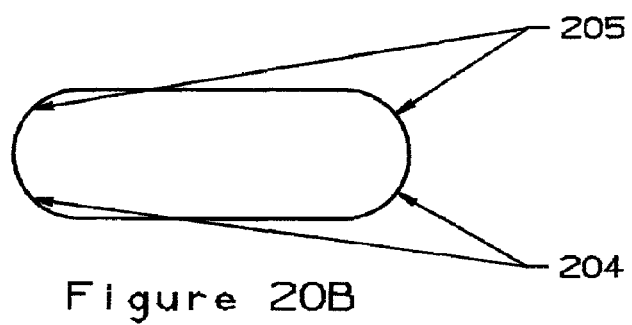
FIG. 20B shows another use of radii in a high aspect ratio enclosed finer.
Figure 20C:
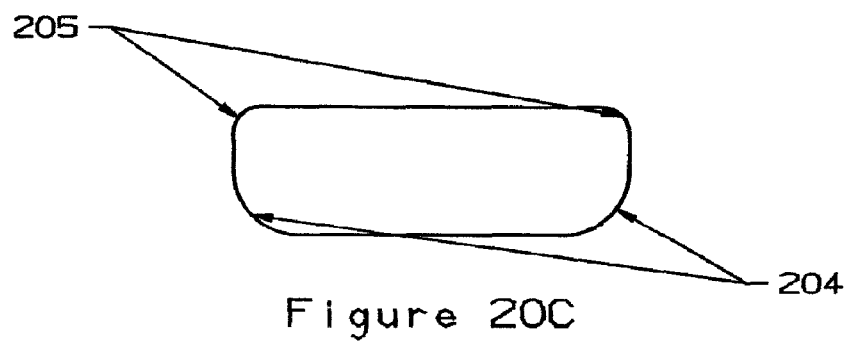
FIG. 20C shows another use of radii in a high aspect ratio enclosed finer.

FIG. 20A, 20B, and 20C show the range of the sizes of radii that will maximize the fining efficiency for an enclosed finer. In FIG. 20A, the height of the finer at its center is (203) and the total width is (201). A finer is considered an enclosed finer if the width (207) of the free surface (208) of glass is less than 75 percent of the width of the finer (201). A rectangular finer where the top is horizontal and the glass contacts the top over its entire width is considered an enclosed finer as shown in FIGS. 20B and 20C. FIG. 20A has the radius (204) of the bottom edge to side intersection equal to 20 percent of the height of glass (202) in the finer and the radius (205) of the top edge to side intersection equal to 20 percent of the height of glass (202) in the finer. FIG. 20B has the radius (204) of the bottom edge to side intersection equal to 50 percent of the height of glass (202) in the finer and the radius (205) of the top edge to side intersection equal to 50 percent of the height of glass (202) in the finer. In FIG. 20B, the radii are equal and comprise the extent of the edge of the finer. In FIG. 20C, the radius (205) of the top edge to side intersection is equal to 20 percent of the height of glass (202) in the finer and the radius (204) of the bottom edge to side intersection is equal to 50 percent of the height of glass (202) in the finer. Any combination of top and bottom radii within the 20 percent to 50 percent range would increase the efficiency of the finer relative to the quantity of platinum used.

Figure 21A:
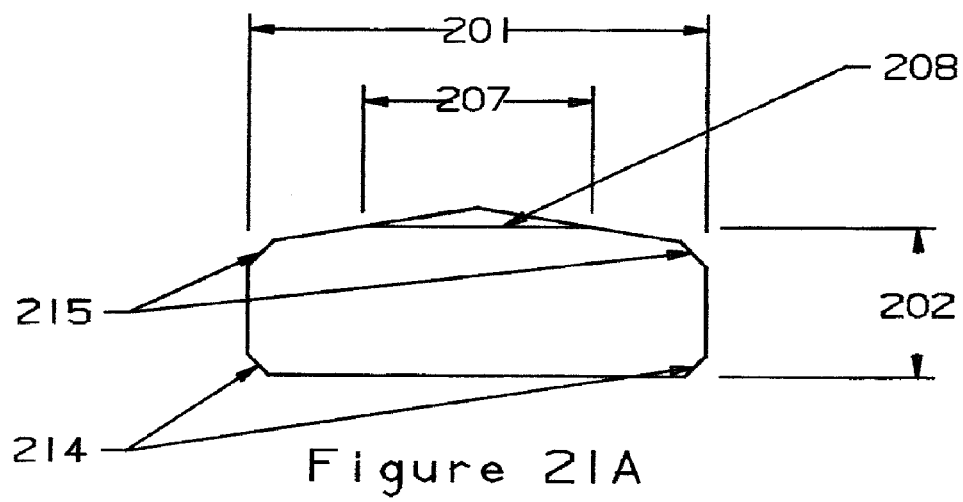
FIG. 21A shows one use of chamfers in a high aspect ratio enclosed finer.
Figure 21B:
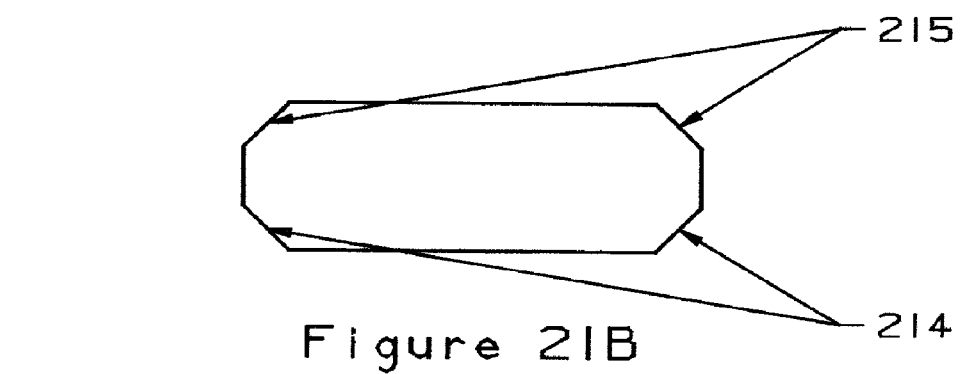
FIG. 21B shows another use of chamfers in a high aspect ratio enclosed finer.
Figure 21C:
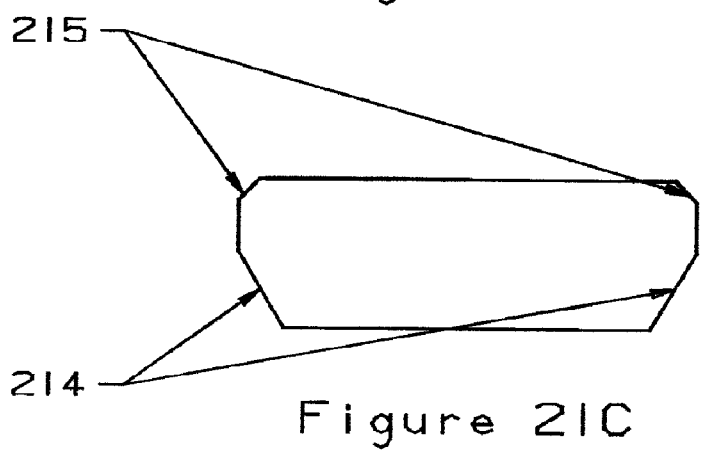
FIG. 21C shows another use of chamfers in a high aspect ratio enclosed finer.

FIGS. 21A, 21B, and 21C show the range of the sizes of chamfers that maximize the fining efficiency for an enclosed finer. A finer is considered an enclosed finer if the width (217) of the free surface (218) of glass is less than 75 percent of the width of the finer (219). A rectangular finer whereby the top is horizontal and the glass contacts the top over its entire width is considered an enclosed finer. In FIG. 21A, the chamfer (214) of the bottom edge to side intersection is equal to 45 degree)(°) by 14 percent of the height of the glass (202) in the finer, and the chamfer (215) of the top edge to side intersection is equal to 45° by 14 percent of the height of the glass (202) in the finer. In FIG. 21B, the chamfer (214) of the bottom edge to side intersection is equal to 45° by 30 percent of the height of the glass (202) in the finer, and the chamfer (215) of the top edge to side intersection is equal to 45° by 30 percent of the height of the glass (202) in the finer. The chamfers are equal in FIG. 21B. In FIG. 21C, the chamfer (215) of the top edge to side intersection is equal to 45° by 14 percent of the height of the glass (202) in the finer, and the chamfer (214) of the bottom edge to side intersection is equal to 60° by 30 percent of the height of the glass (202) in the finer. Any combination of top and bottom chamfers between 45° and 60° by 14 percent to 30 percent of the height of glass (202) in the finer increases the efficiency of the finer relative to the quantity of platinum used.

Figure 22A:
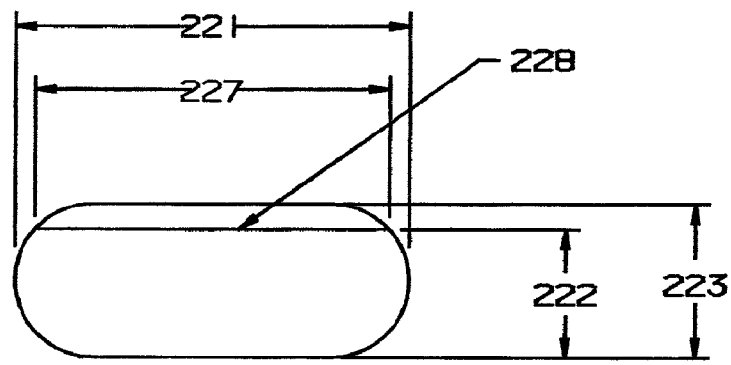
FIG. 22A shows one use of radii in a high aspect ratio free surface finer.
Figure 22B:
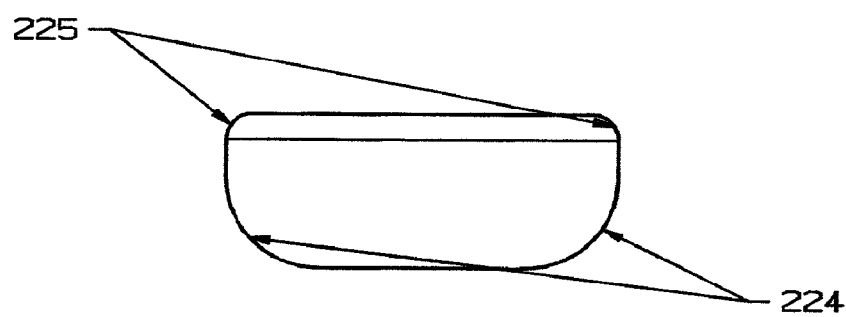
FIG. 22B shows another use of radii in a high aspect ratio free surface finer.
Figure 22C:
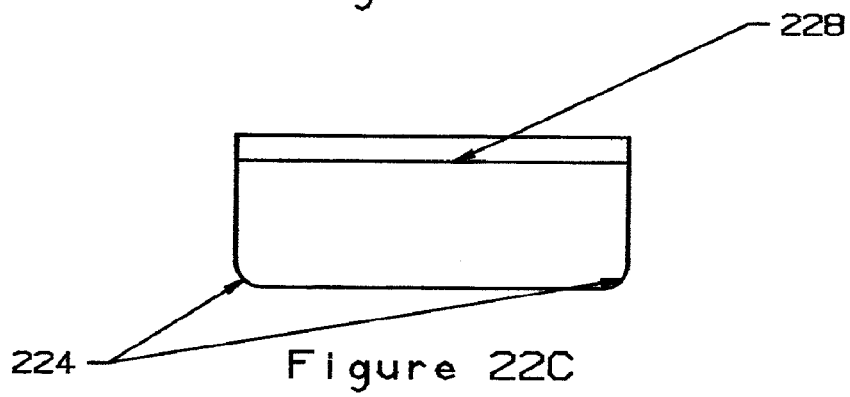
FIG. 22C shows another use of radii in a high aspect ratio free surface finer.

FIGS. 22A, 22B, and 22C show the range of the sizes of radii that maximizes the fining efficiency for a free surface finer. A finer is considered a free surface finer if the width (227) of the free surface (228) of glass is greater than 75 percent of the width of the finer (221). FIG. 22A shows a free surface finer with semi-circular sides where the top and bottom side radii (224) and (225) are equal to one half the height (223) of the finer cross-section. In FIG. 22B, the radius (224) of the bottom edge to side intersection is equal to 71 percent of the height of the glass (222) in the finer, and the radius (225) of the top edge to side intersection is equal to 20 percent of the height (223) of the finer. FIG. 22C has no radius at the top edge to side intersection of the finer. FIG. 22C has the radius (224) of the bottom edge to side intersection equal to 20 percent of the height of the glass (222) in the finer. Any combination of top radii within the 0 and 50 percent of the height of the finer and bottom radii within the 20 percent to 71 percent of the height of the glass in the finer increases the efficiency of the finer relative to the quantity of platinum used.

Figure 23A:
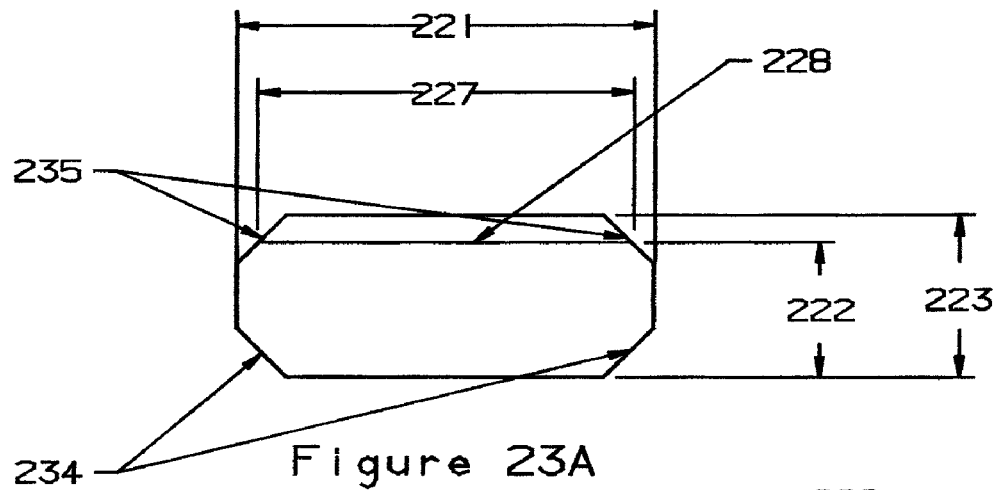
FIG. 23A shows one use of chamfers in a high aspect ratio free surface finer.
Figure 23B:
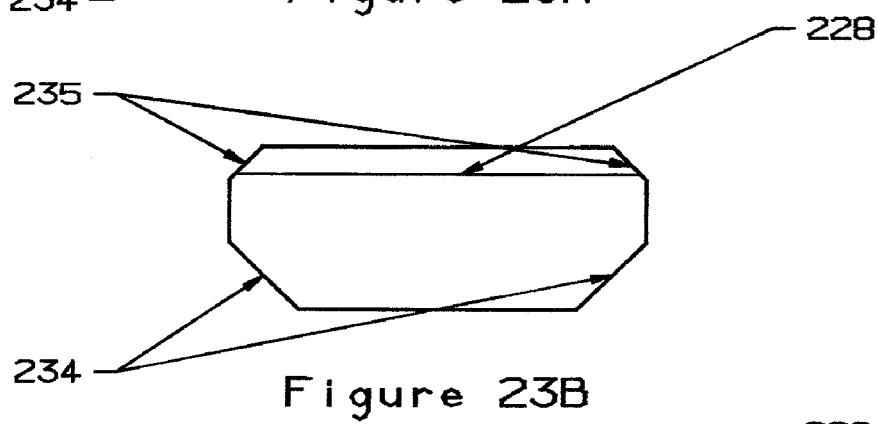
FIG. 23B shows another use of chamfers in a high aspect ratio free surface finer.
Figure 23C:
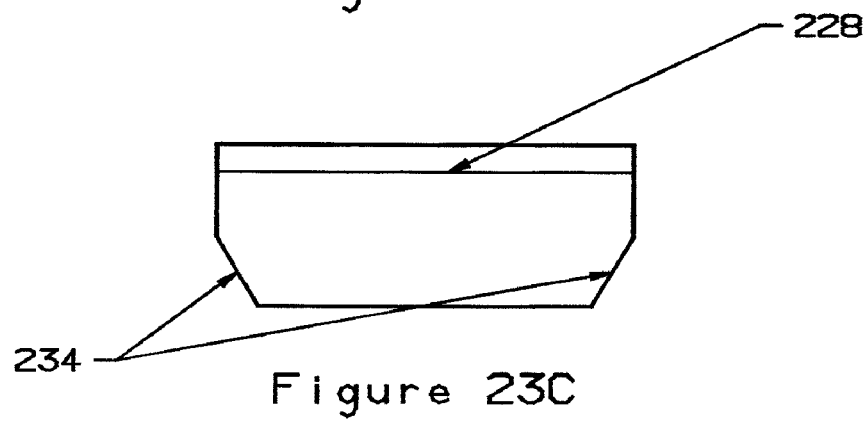
FIG. 23C shows another use of chamfers in a high aspect ratio free surface finer.

FIGS. 23A, 23B, and 23C show the range of the sizes of chamfers that maximize the fining efficiency for a free surface finer. A finer is considered a free surface finer if the width (227) of the free surface (228) of glass is greater than 75 percent of the width of the finer (221). In FIG. 23A, the chamfer (234) of the bottom edge to side intersection is equal to 45° by 30 percent of the height (223) of the finer and the chamfer (235) of the top edge to side intersection is equal to 45° by 30 percent of the height (223) of the finer. In FIG. 23B, the chamfer (234) of the bottom edge to side intersection is equal to 45° by 71 percent of the height of the glass (222) in the finer and the chamfer (235) of the top edge to side intersection is equal to 45° by 20 percent of the height (223) of the finer. FIG. 23C has no chamfer at the top edge to side intersection of the finer. FIG. 23C has the chamfer (234) of the bottom edge to side intersection to be equal to 60° by 30 percent of the height (232) of the finer. Any combination of top chamfers within the 45° to 60° and 0 to 30 percent of the height of the finer and bottom chamfers within the 45° to 60° by 30 percent to 71 percent of the height of the glass in the finer increases the efficiency of the finer relative to the quantity of platinum used.

FIGS. 24A through 24D illustrate embodiments of an inverted apex finer where the apex is pointed down (inverted) and the outside edges (244) are vertically the highest part of the finer cross-section. FIG. 25 is a view of a finer (251) with the cross-section similar to that in FIG. 24A. The glass enters the finer (251) at the inlet end (253). In these embodiments the seeds rise to the two outside edges and are dispersed to either a vent, which spans the entire top of the exit end (254) of the finer (251) or two separate vents (255) at the exit end (254) of the finer (251). This configuration is especially adaptable to a single central exit (254).

Figure 24A:
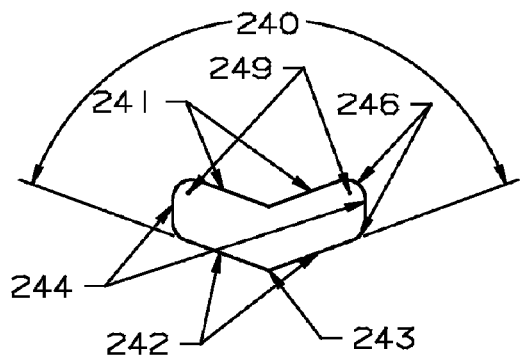
FIG. 24A shows a six sided finer cross-section with an inverted apex gable roof and radii at the ends in an embodiment of the present invention.
Figure 24B:
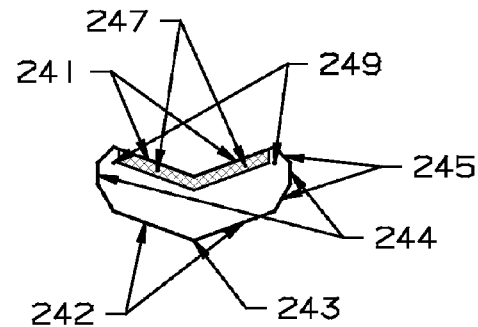
FIG. 24B shows a six sided finer cross-section with an inverted apex gable roof, fining ribs and chamfered ends in an embodiment of the present invention.
Figure 24C:
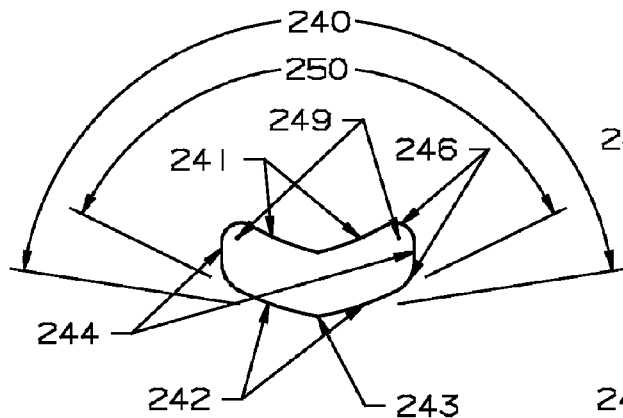
FIG. 24C shows a six sided finer cross-section with an inverted apex Gothic arch roof and radii at the ends in an embodiment of the present invention.
Figure 24D:
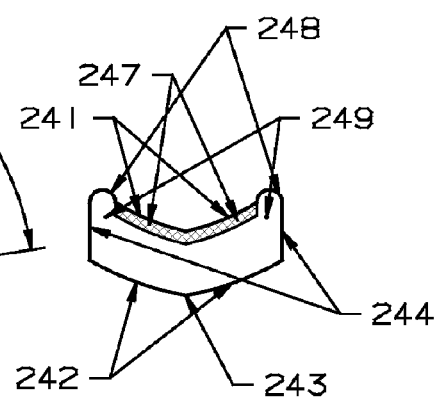
FIG. 24D shows a six sided finer cross-section with an inverted apex Gothic arch roof, fining ribs and corner vents at the ends in an embodiment of the present invention.
Figure 25:
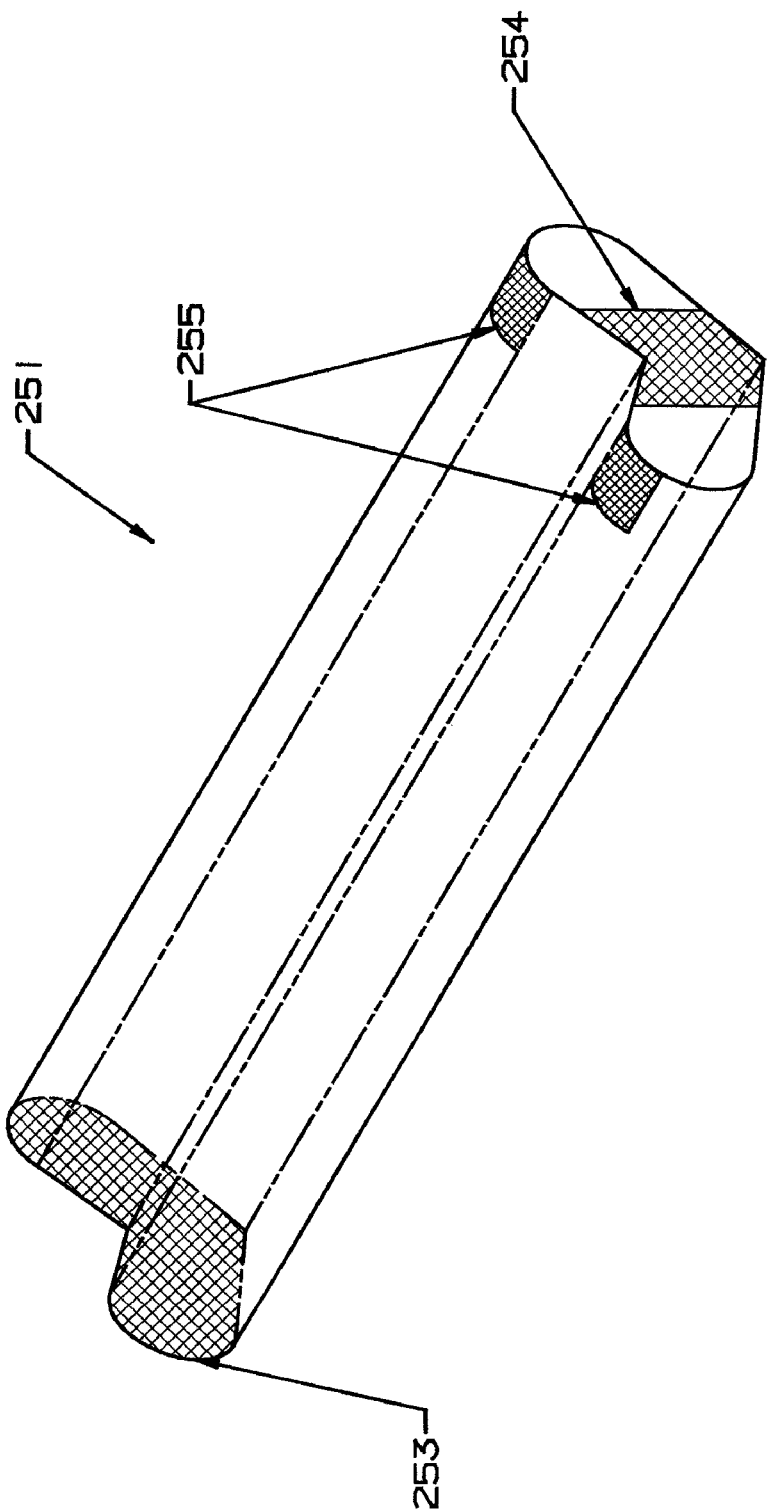
FIG. 25 shows an inverted apex gable roof finer with fully radiused ends.

FIG. 24A shows the straight bottom elements (242) with an obtuse angle (240) at the inverted apex (243). The top elements (241) are parallel to the bottom elements (242). The sides (244) are joined to the bottom and top by equal radii (246). FIG. 24B shows the straight bottom elements joined at the inverted apex (243). The top elements (241) are parallel to the bottom elements (242). The sides (244) are joined to the bottom and top by unequal chamfers (245). A fining rib (247), which is continuous across the top surface, ends at each upper outside corner (249) to allow the seeds to flow toward the vents (255). FIG. 24C shows curved bottom elements (242) with an obtuse angle (240) at the inverted apex (243), which has the form of an inverted gothic arch. The top elements (241) are equidistant from the bottom elements (242). The sides (244) are joined to the bottom and top by unequal radii (246). FIG. 24D shows curved bottom elements (242) joined at the inverted apex (243). The top elements (241) are equidistant from the bottom elements (242). The sides (244) are joined to the bottom elements (242) by an obtuse angle. The sides (244) are joined to the top elements (241) by corner vents (248), which conduct the seeds toward the exit end vents (255). A fining rib (247), which is continuous across the top surface, ends at each upper outside corner (249) to allow the seeds to flow in the corner vents (248) toward the exit end vents (255). A preferred embodiment of an inverted gabled roof finer has an obtuse included angle (240) of 140 degrees. Obtuse included angles (240) between 190 degrees and 90 degrees are also within the spirit of the present invention. A preferred embodiment of an inverted gothic arch roof finer has an apex obtuse included angle (240) of 160 degrees and an end obtuse included angle (250) of 130 degrees. Additional obtuse included angles, in the range of 178 degrees to 130 degrees for the apex obtuse included angle (240) and 160 degrees to 90 degrees for the end obtuse included angle (250), are also within the spirit of the present invention.

Figure 26:
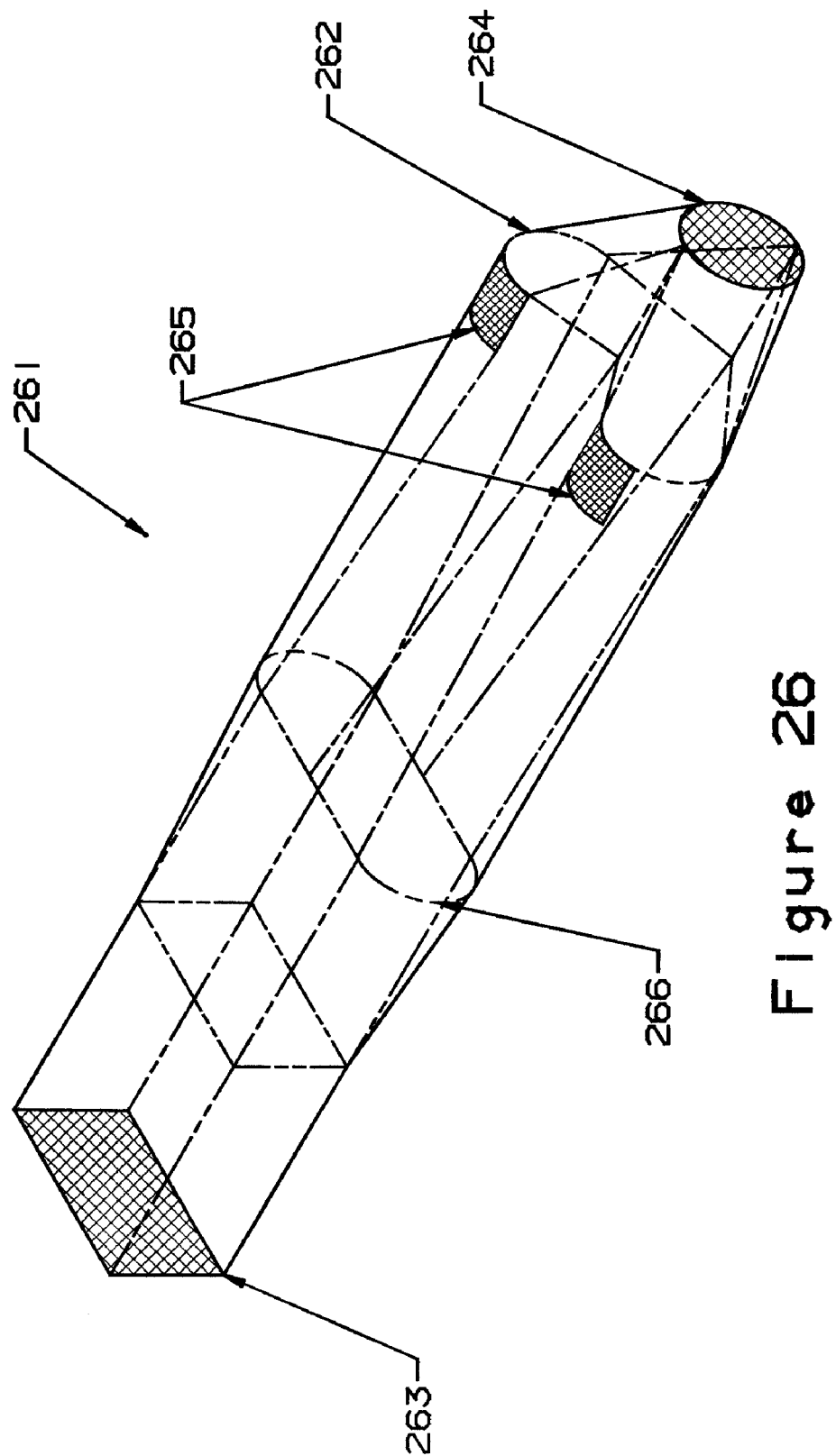
FIG. 26 shows a finer with multiple cross sections in an embodiment of the present invention.

FIG. 26 shows an example of a finer (261) with an inlet (263), an outlet (264), and two atmospheric vents (265), which has multiple cross-sections. The finer (261) configuration has an inlet end (263) rectangular cross-section for a portion of the length of the finer (261), which transitions first to a rectangular cross-section with radiused ends (266), then to an inverted apex with radiused ends (262) and finally to a circular exit (264). The cross-sections in FIG. 26 also have different aspect ratios. The rectangular inlet (263) has an aspect ratio of 2. The rectangular cross-section with radiused ends (261) and the inverted apex with radiused ends cross-section (262) each have an aspect ratio of 3. The circular exit has an aspect ratio of 1. The combination of cross-sections and aspect ratios in FIG. 26 is just an example of how the cross-sections and aspect ratios described herein may be combined in a multiple cross-section finer.

In a preferred embodiment, the finer cross-section varies along its length and incorporates by reference the cross-sections of U.S. Pat. No. 7,150,165 and U.S. Patent Publication 2007/0084247, including the cross-sections shown in FIGS. 20 through 29, and also includes the cross-sections of FIG. 5, FIG. 9A through 9D, and FIGS. 10A through 10D.

FIGS. 11A and 11B show an embodiment (110) of the present invention which has a large free surface (118) in the finer (113) and provisions for a glass free surface level measuring device (117). A free surface section (97) as shown in FIG. 9D extends a distance (112) back towards the stirring device (34) from the finer vent (115). The finer slopes downward at an angle (119) such that the free surface (118) has a constant depth. The angle (119) is designed to match the fluid head loss of the glass flowing in the finer (113). The free surface section (97) length (112) may be the entire length of the finer if desired. It may even extend into the cooling and conditioning section (5).

FIG. 11B shows an embodiment of the present invention whereby a traditional glass contacting level measuring device (117) is used. The glass industry has used a glass contacting level measuring device for 50 plus years. It is reasonably reliable and inexpensive, but often leaves a defect in the glass product when the glass it touches is part of the saleable product. It can be used in the present invention because it is installed in one of the finer vents (115) where the glass it touches ends up in the unusable inlet edge (45) of the formed glass sheet as shown in FIG. 4C.

FIGS. 12A and 12B show an embodiment (120) of the present invention which has a large free surface (118) in the finer (123) and provisions for a glass free surface level measuring device (127). The glass industry has used a laser level measuring device for approximately 30 years. It is reliable, but requires a line of sight that allows reflection from the glass free surface (118). It is difficult to configure a laser level device in a traditional bowl (6) as shown in FIG. 1, but the long longitudinal distance (122) of the apex of a dual apex finer provides more than adequate room for installation. It can be used in the present invention because it is installed in one of the finer vents (125), where the glass that is exposed to the atmosphere ends up in the unusable inlet edge (45) of the formed glass sheet as shown in FIG. 4C.

Figure 13:
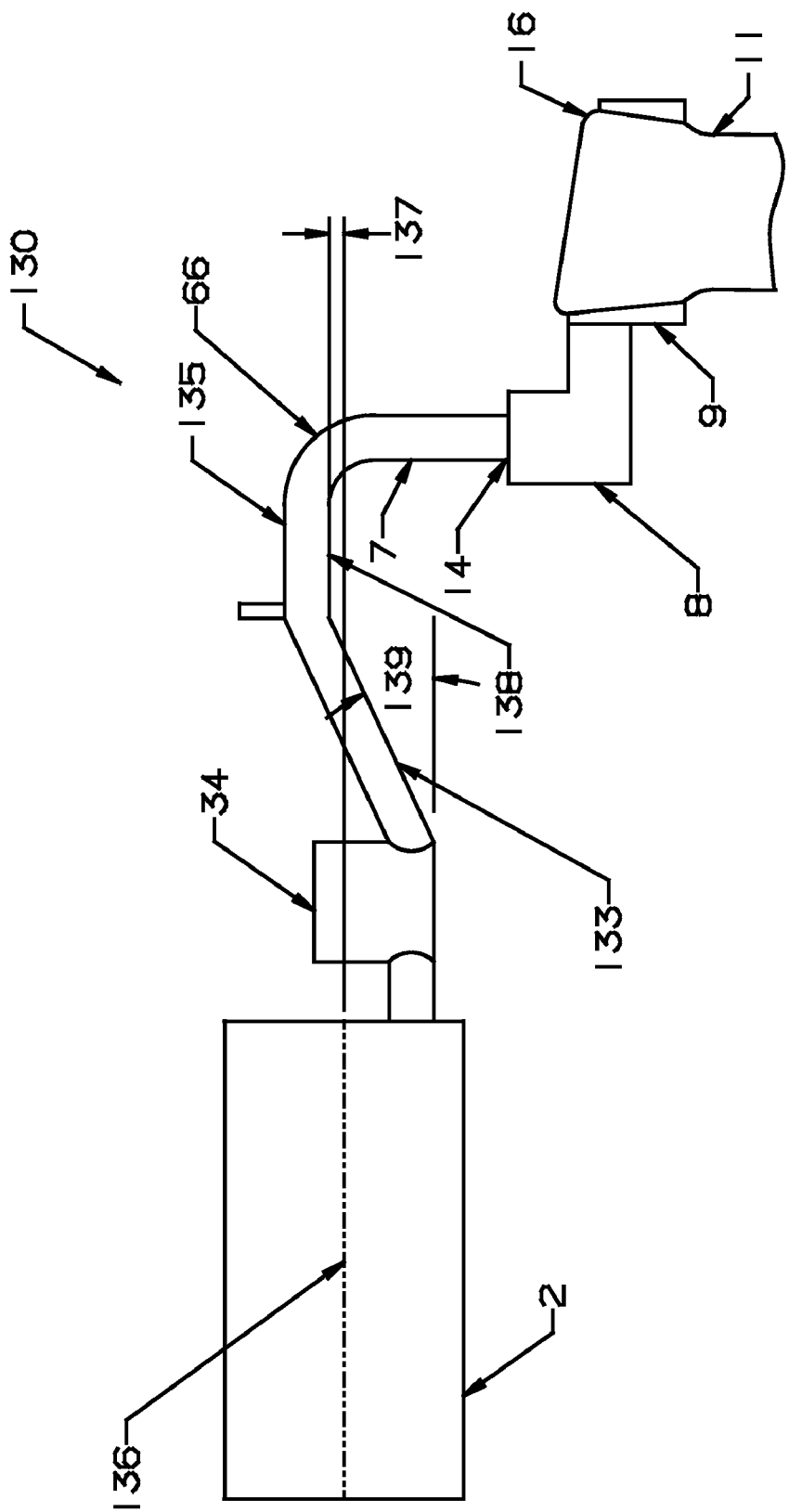
FIG. 13 shows the principle parts of "The Overflow Process" glass sheet manufacturing system whereby the stirring device has pumping action that flows glass from the melting furnace to the forming process in an embodiment of the present invention.

FIG. 13 shows another embodiment (130) of the present invention whereby the stirring device has pumping action that provides hydrostatic pressure for the glass to flow from the melting furnace (2) to the forming process. U.S. Pat. No. 6,763,684 discloses an example of a stirrer with pumping action and is incorporated herein by reference. The finer (133) is angled up (139) such that the glass level of the glass free surface (136) in the melting furnace is vertically below the bottom (138) of the cooling and conditioning pipe (135) by a distance (137), thus there is no glass flow by gravitational forces to the sheet forming apparatus when the stirrers are stationary. The stirrers in the stirring device (34) are engineered to produce enough hydrostatic pressure to overcome gravity and raise the glass level vertically above the bottom (138) of the cooling and conditioning pipe (135), thus providing glass flow to the sheet forming apparatus. This embodiment is an alternate method of stopping the flow to the sheet forming apparatus, to the prior art needle (13) shown in FIG. 1.

FIGS. 14A through 14D, FIGS. 15A and 15B and FIGS. 16A through 16D show embodiments of the present invention, which prevent platinum particles caused by the reduction of platinum by tin from contaminating the saleable portion of the glass sheet. Any platinum particles, which are created in the finer (153) or cooling and conditioning section (155), are confined to an area of the glass flow path that can be discarded by a glass overflow device at the downcomer pipe (7) to inlet pipe (158) interface (14).

Figure 14A:
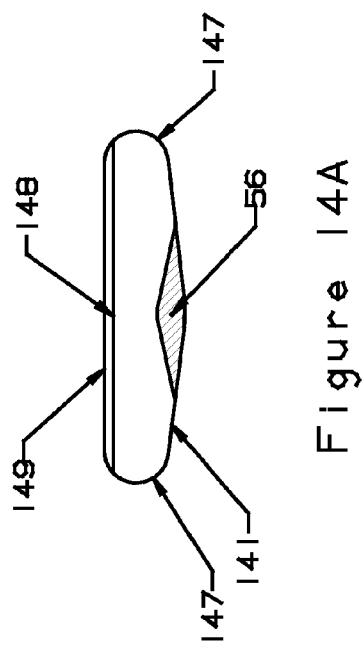
FIG. 14A shows a high aspect ratio free surface finer cross-section with generous corner radii and a shallow V shaped bottom in an embodiment of the present invention.
Figure 14B:
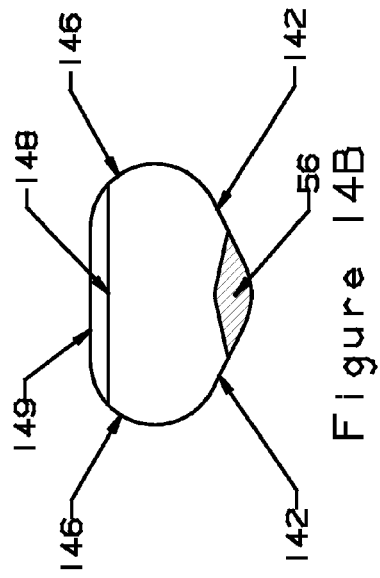
FIG. 14B shows a low aspect ratio free surface finer cross-section with generous corner radii and a V shaped bottom in an embodiment of the present invention.
Figure 14C:
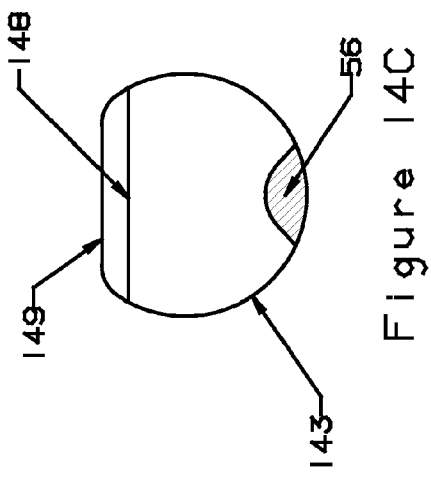
FIG. 14C shows a cylindrical free surface finer cross-section modified to a flat top configuration in an embodiment of the present invention.
Figure 14D:
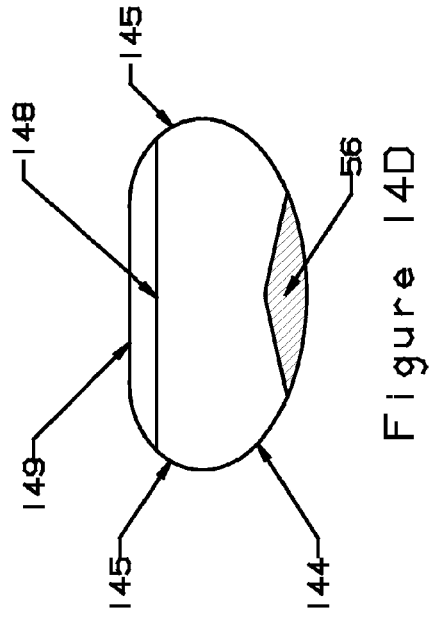
FIG. 14D shows an elliptical free surface finer cross-section modified to a flat top configuration in an embodiment of the present invention.

FIGS. 14A through 14D show finer cross-sections, which have a free surface (148) over the majority of the width of the finer. The advantage of this wide free surface (148) is that the tin in the glass does not contact the platinum top surface of the finer and therefore does not chemically reduce the platinum. The embodiment in FIG. 14A has generous end radii (147), a flat top (149) and a shallow V shaped bottom (141). The embodiment in FIG. 14B has bottom sections (142) which form a V shape and generous end radii (146). This would be useful if large platinum particles are the result of tin, in a tin refined glass, reducing the platinum walls of the delivery system. The embodiment in FIG. 14C is a cylindrical (143) finer modified to have a flat top (149). It has a free surface (148). This embodiment would have a large part of the structural integrity of the cylindrical shaped finer, but would not have the refining efficiency of a high aspect ratio finer. The embodiment in FIG. 14D is an elliptical shaped finer. The bottom (144) is a large ellipse and the top is formed by two smaller ellipses (145) connected together by the flat top (149). It has a free surface (148). This finer would have a higher fining efficiency than the cylindrical finer in FIG. 14C. An advantage of the finer cross-sections with the wide top free surface (148) is that no platinum particles fall into the center of the glass stream. The particles with a low weight to volume ratio stay near the vertical and bottom surfaces. The particles with a high weight to volume ratio migrate down the vertical sides to the bottom surface. An advantage of the V shaped bottom and rounded bottom embodiments is that any high weight to volume ratio particles in the glass migrate to the section (56), which forms the unusable distal edge of the sheet. The flat top (149) shown in the finers of FIGS. 14A through 14D is the most economical for platinum usage. An arched or curved top may be preferable for structural reasons and could be substituted for the flat top with no change in functionality.

FIG. 15A shows the principle parts of "The Overflow Process" glass sheet manufacturing system (150) with a sloped finer with a full length free surface and an overflow device at the downcomer to inlet pipe interface in an embodiment of the present invention. The inlet pipe (158) has been modified to include an overflow device (151), from which flows a small percentage (154) of the total glass stream.

FIG. 15B shows a cross-section of a full length free surface finer (153), a cooling and conditioning section (155), and a transition section (156) shown in FIG. 15A containing a surface baffle (152) at the finer vent (15) in an embodiment of the present invention. The finer (153) is sloped at an angle (159) equal to the hydrostatic pressure loss of the glass as it flows through the finer (153), thus the glass free surface (158) slopes downward at the same angle (159). The free surface of the glass in the cooling and conditioning section (155) is curved downward (157) as the hydrostatic pressure loss increases as the glass is cooled. A baffle (152) at the downstream side of the vent (15) traps any surface bubbles such that they agglomerate, break-up, and vent to the atmosphere.

FIG. 16A shows the location of the overflow device (151) at the downcomer pipe (7) to inlet pipe (158) interface (14) in an embodiment of the present invention.

FIG. 16B is a view downward at section B-B in FIG. 16A. It shows the top of the inlet pipe (158) with the shape of the overflow device (151). In a preferred embodiment, the centerline (167) of the downcomer pipe (7) is located a distance (161) from the centerline (162) of the inlet pipe (158) in a direction away from the overflow device (151). This facilitates glass flow from the entire periphery of the downcomer pipe (7). The shape of the overflow device (151) shown is a typical representation. Its shape in a production implementation would be determined by mathematical and physical modeling, thus the overflow device (151) may have many configurations. Special heating and insulation of the overflow device (151) is required and is known in the art. The quantity of glass (154) discarded in the overflow device (151) can vary from 1 to 20 percent of the total glass flow to the sheet forming apparatus. It would be 2 to 5 percent in a preferred embodiment of this invention.

FIG. 16C is a cross-section through the overflow device (151) showing the bottom of the downcomer pipe (7) located a distance (165) below the free surface (168) of the glass in the overflow device (151) in a preferred embodiment of this invention.

FIG. 16D is a cross-section through the overflow device (151) showing the bottom of the downcomer pipe (7) located a distance (166) above the free surface (168) of the glass in the overflow device (151) in a preferred embodiment of this invention.

The overflow device (151) can be designed for a specific location of the bottom of the downcomer pipe (7), which can be above, at, or below the glass free surface (168) in the overflow device (151). Additionally, the overflow device (151) may be designed to discard the defective glass (154) over a range of the vertical locations of the bottom of the downcomer pipe (7).

The overflow device (151) may be used as a stand alone embodiment to correct glass homogeneity problems at the downcomer pipe (7) to inlet pipe (8) interface (14). U.S. Pat. Nos. 6,889,526, 6,895,782, 6,990,834, and 7,155,935, and U.S. Patent Publication Nos. 2007/0068197 and 2007/0056323 address these problems and are incorporated herein by reference. Glass defects caused by vortex flow and quiescent flow at the downcomer pipe (7) to inlet pipe (8) interface (14) can be eliminated by discarding the questionable glass (154) through the overflow device (151). The flow in this embodiment need not be continuous as discussed above, but can be turned on periodically when defects in the glass sheet associated with the downcomer pipe (7) to inlet pipe (8) interface (14) are found.

Figure 17B:
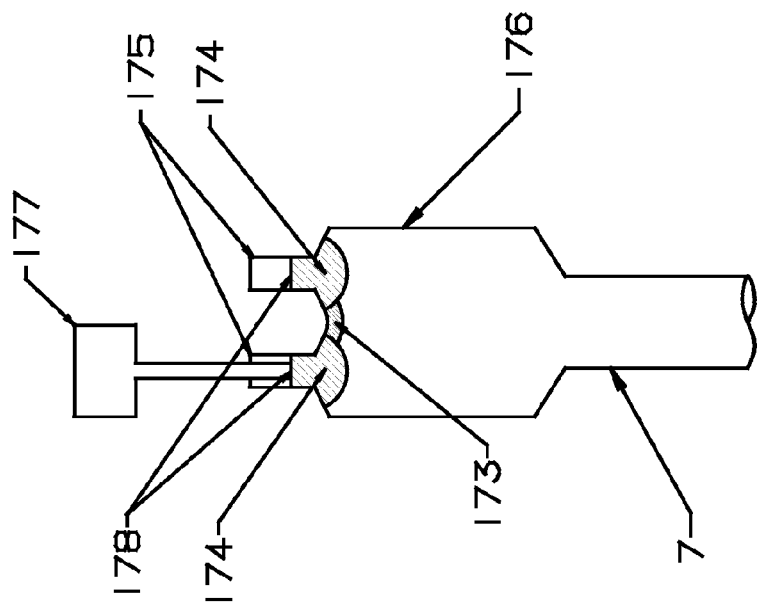
FIG. 17B is an end view of the application of the dual apex principle to a bowl in an embodiment of the present invention.
Figure 17A:
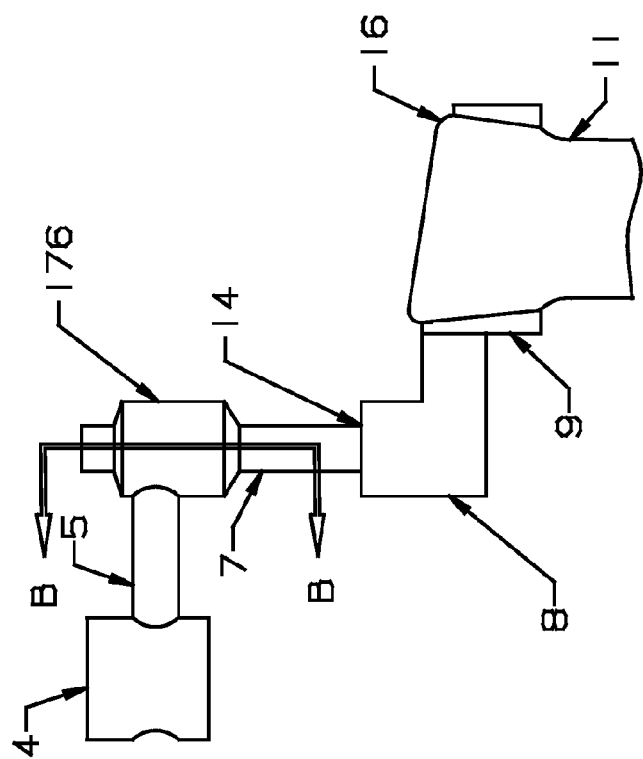
FIG. 17A is a side view of the application of the dual apex principle to a bowl in an embodiment of the present invention.

FIG. 17A and 17B illustrate the application of the dual apex principle to a prior art delivery system (10) in an embodiment of this invention. FIG. 17A shows a stirring device (4) that feeds glass to a cooling and conditioning pipe (5) that in turn feeds glass to a modified bowl (176) that feeds glass to the downcomer pipe (7), which feeds glass to the forming process (8, 9, 11, and 16). FIG. 17B is view B-B in FIG. 17A, which shows the top of the bowl (176) that has been modified to incorporate two vents (175), which have free surfaces (178). A traditional glass contacting level measuring device (177) has been installed in one of the vents (175). The glass at the free surface (178) is subject to volatilization from exposure to the atmosphere, thus affecting the glass homogeneity, and the measuring device (177) also affects the quality of the glass surface. The vents (175) and the measuring device (177) do not have an adverse effect on the product quality as the glass (174) that flows past the vents (175) of the bowl (176) flows in the areas (44) in the downcomer pipe (7) shown in FIG. 4B and thus forms the unsaleable inlet end portion (45) of the sheet as shown in FIG. 4C. The glass (173) that flows between the vents (175) is not disturbed by the free surfaces (178) as it is in continuous contact with the internal platinum surfaces of the delivery system. This glass (173) flows in areas (43) in the downcomer pipe (7) shown in FIG. 4B and thus forms a portion (43) of the surface of the sheet as shown in FIG. 4C.

Figure 18:
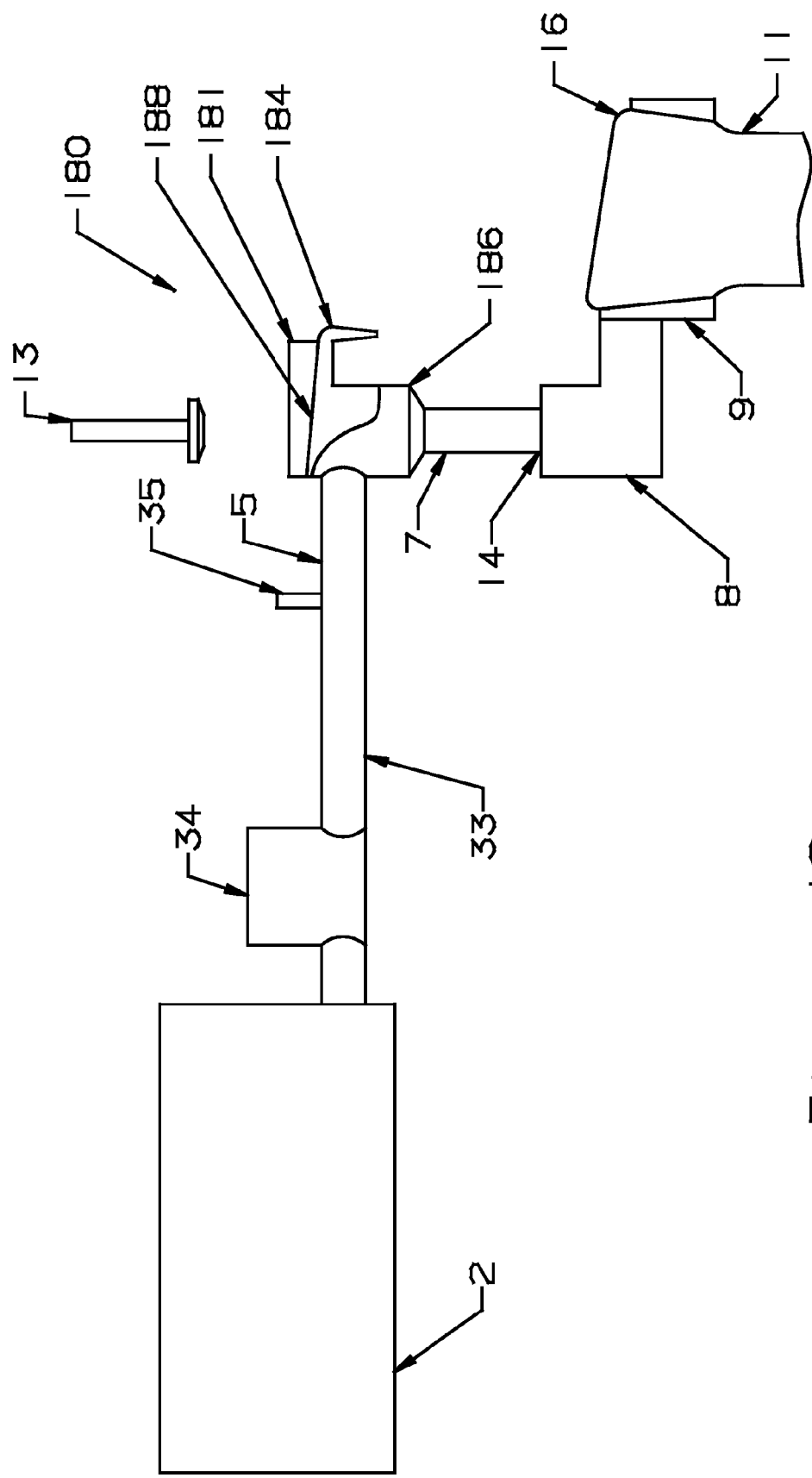
FIG. 18 shows the principle parts of "The Overflow Process" glass sheet manufacturing system with an overflow device in the bowl in an embodiment of the present invention.

FIG. 18 shows another embodiment of a delivery system (180) of the present invention, where the bowl (6) in the prior art is replaced by a bowl (186) with an overflow device (181). There is a glass free surface (188) in the overflow device (181), which is the same as the free surface normally in the bowl (6). The glass (184) which flows out of the overflow device (181) contains the glass which flows at the top surface of the finer insuring high quality glass flow to the overflow process. The finer vent (35) shown is optional as the glass defects which would normally escape through the finer vent (35) are part of the glass flow (184) exiting through the overflow device (181). A needle (13) is optionally provided to stop glass flow.

Figure 19:
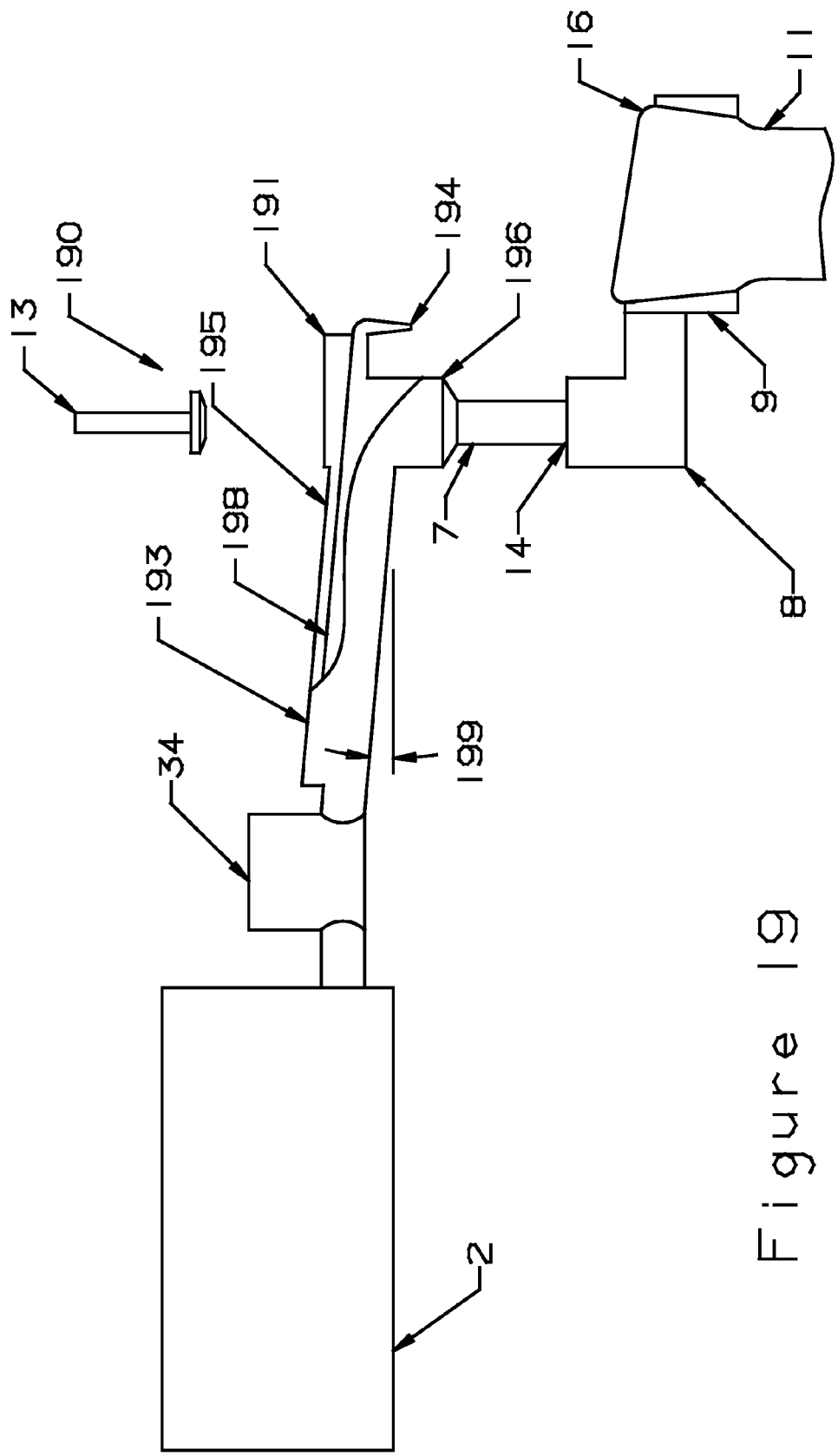
FIG. 19 shows the principle parts of "The Overflow Process" glass sheet manufacturing system with a sloped finer with a full length free surface and an overflow device in the bowl in an embodiment of the present invention.

FIG. 19 shows another embodiment of a delivery system (190) of the present invention, where the bowl (6) in the prior art is replaced by a bowl (196) with an overflow device (191). The finer bottom is angled down (199) such that there is a glass free surface (198) in the finer (193), the cooling and conditioning section (195), and the overflow device (191). The glass (194) which flows out of the overflow device (191) contains the glass which flows at the top surface of the finer, insuring high quality glass flow to the overflow process. A needle (13) is optionally provided to stop glass flow.

The major components of the overflow downdraw manufacturing process are the melting furnace, the delivery system, and the sheet forming apparatus. The length of the typical production campaign is presently limited by the life of the component which first fails or has degraded operation. The prior art practice at this time is to rebuild all three components when one component fails. This takes considerable time, not only to dismantle and rebuild each component, but extensive cool down and reheat time is required for all components. The life of the melting furnace is limited by present technology to approximately two years. The delivery system, which is made primarily of precious metal, does not have this inherent life limitation, but its practical life is four to six years. The sheet forming apparatus has a life limitation of approximately two years unless the technology of U.S. Pat. Nos. 6,889,526, 6,895,782, 6,990,834, 7,155,935, U.S. Patent Publication 2006/0016219, and U.S. Patent Publication 2007/0068197, all herein incorporated by reference, is implemented, in which case a life of four years is likely achievable.

Figure 30:
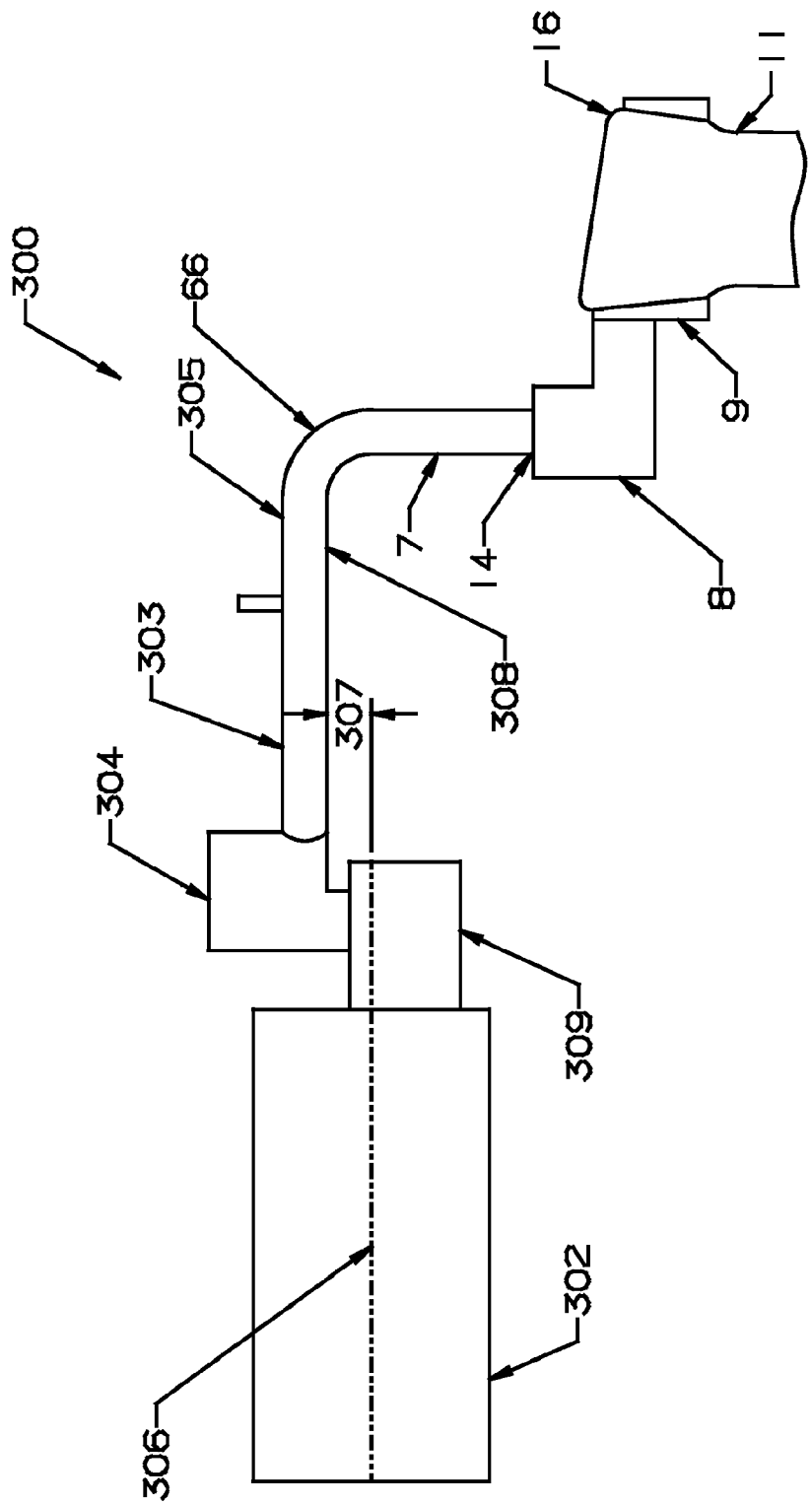
FIG. 30 shows the principle parts of "The Overflow Process" glass sheet manufacturing system whereby the stirring device has pumping action that flows glass from the melting furnace to the forming process in an embodiment of the present invention.

In FIG. 1, the fixed connection of the delivery system (3) to the melting furnace (2) at point (19) is a major impediment to repairing only the melting furnace. Keeping the delivery system and the sheet forming apparatus at elevated temperature and fabricating this solid connection is a problem. FIG. 30 is an embodiment of the present invention whereby this connection is not a fixed connection, but is a fluid connection, thus the two components are easily disconnected and reconnected. Additionally, the interconnection is both adjustable and flexible. FIG. 30 shows a melting furnace (302) that has a forebay (309), which has a glass free surface (306) a vertical distance (307) below the bottom (308) of the finer (303). The stirring device (304), which has a significant pumping action, extends down into the free surface of the glass (306) and pumps the glass into the finer (303), thus feeding molten glass (16) to the sheet forming apparatus.

FIGS. 31A and 31B show additional detail of two embodiments of a connection between the melting furnace (302) and the stirring device (304). The stirring device has a stirrier (311), which may have different configurations, two of which would be either an auger or one of the mixing stirrer configurations of U.S. Pat. No. 6,763,684, incorporated herein by reference. FIG. 31A shows the bottom of the casing (317) of the stirring device (304) extending below the glass free surface (306) in the forebay (309) a distance (313). Stirrer (311) provides the hydrostatic pressure to raise the glass (16) to the finer (303) and subsequently to the sheet forming apparatus. A drawback of this configuration with some glasses would be the zones of quiescent flow (316) between the casing of the stirring device (304) and the walls of the melting furnace (302) and the forebay (309). FIG. 31B shows a configuration whereby the bottom of the casing (318) of the stirring device (304) is above the glass free surface (306) in the forebay (309) a distance (314). The bottom (319) of the stirrer (311) extends down below the free surface (306) in order to suck the free surface (315) of the glass into the bottom (318) of the casing of the stirring device (304). This configuration would not have the zones of quiescent flow (316).

FIG. 31A shows the bottom (319) of the stirrer (311) located vertically above the bottom (317) of the casing of the stirring device (304), and FIG. 31B shows the bottom (319) of the stirrer (311) located vertically below the bottom (318) of the casing of the stirring device (304). The vertical positioning of the bottom (319) of the stirrer (311) relative to the bottom (317 or 318) of the casing of the stirring device (304) is an operational parameter which may be altered in order to minimize the generation of glass homogeneity defects. FIG. 31A also shows the bottom (317) of the casing of the stirring device (304) shaped (310) in order to facilitate smooth flow of the glass (16) into the stirring device (304).

Figure 32A:
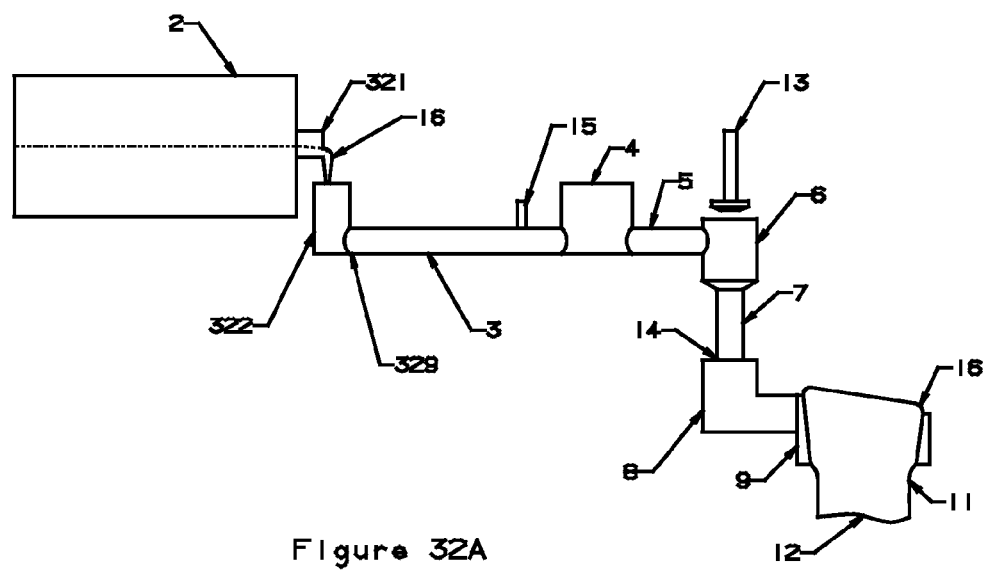
FIG. 32A shows one embodiment of a fluid connection between a melting furnace and a finer.
Figure 32B:
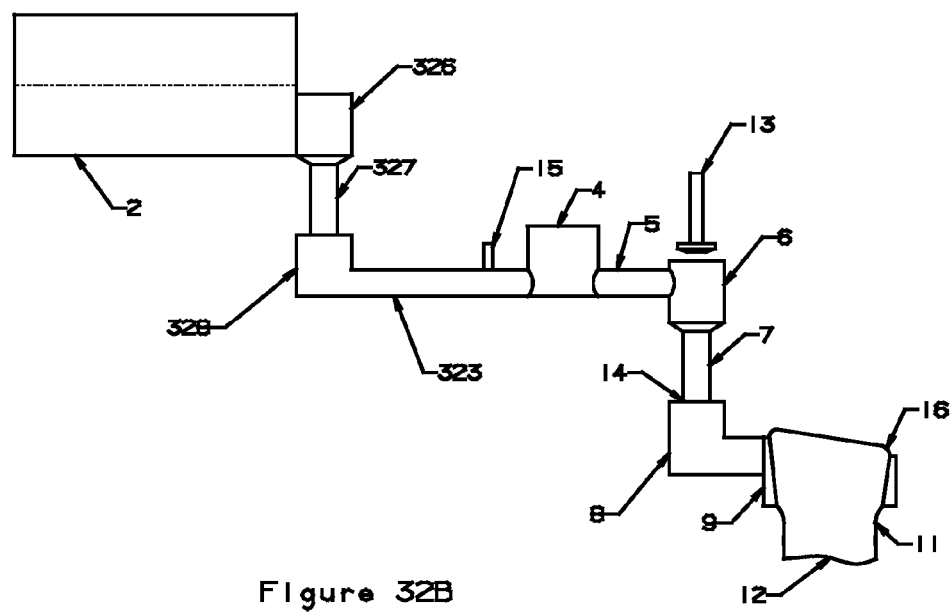
FIG. 32B shows another embodiment of a fluid connection between a melting furnace and a finer.

FIGS. 32A and 32B show two examples of a fluid connection between the melting furnace (2) and the finer (3). FIG. 32A shows a fluid connection that is an overflow device (321). Molten glass (16) flows out of the melting furnace (2) through the overflow device (321) into a receiving chamber (322), which is attached to the finer (3) at a connection (329). FIG. 32B shows a fluid connection which is an adaptation of the downcomer pipe (7) to inlet pipe (8) connection (14). The glass flows from the melting furnace (2) into a bowl like chamber (326), then down the downcomer pipe (327) into the finer (323) through an inlet pipe (328).

Figure 33:
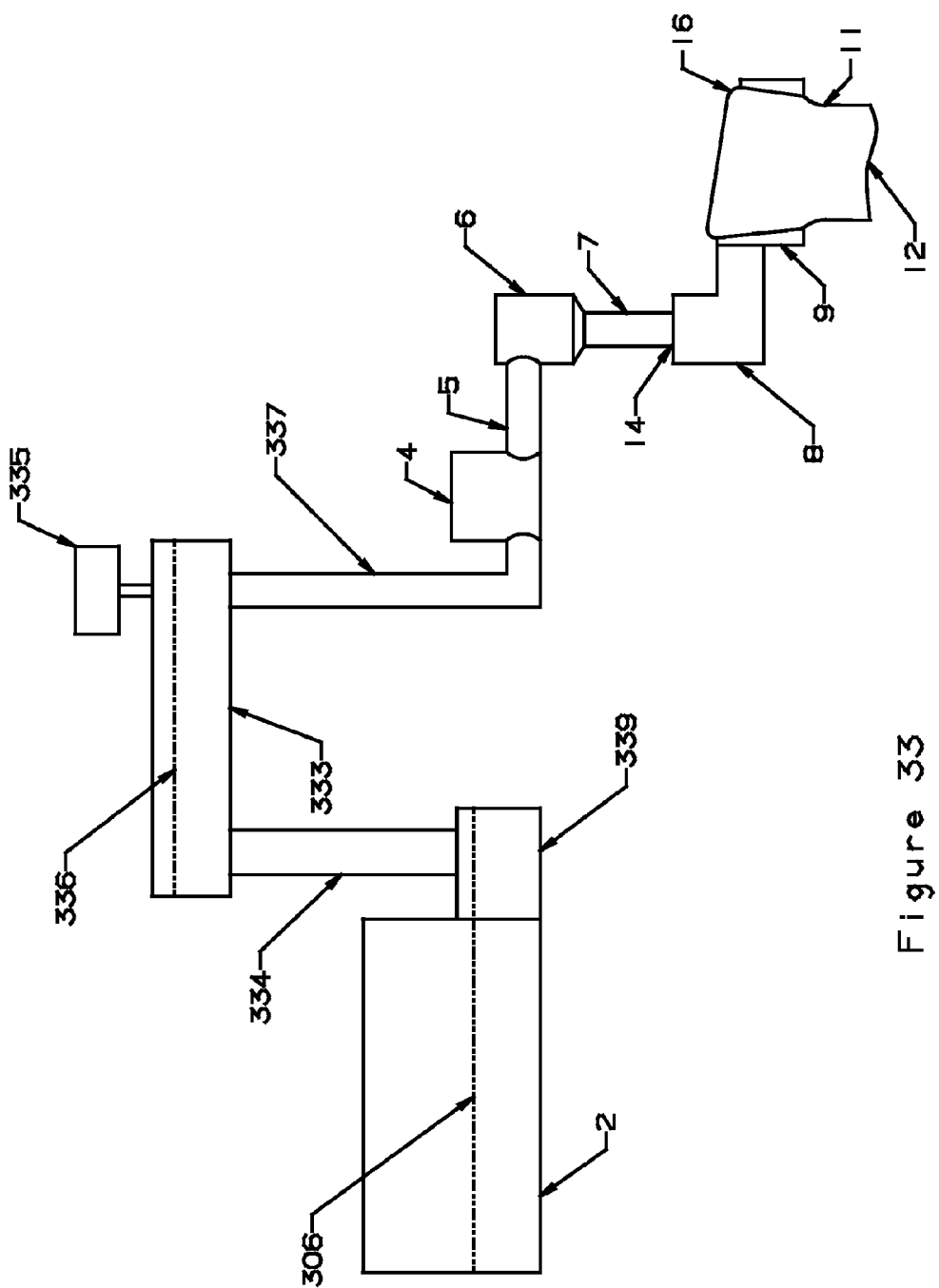
FIG. 33 shows another embodiment of a fluid connection between a melting furnace and a finer.

FIG. 33 shows an example of a fluid connection between the melting furnace (2) and a vacuum finer (333). A vacuum device (335) induces a low absolute pressure (vacuum) on the free surface (336) in the vacuum finer (333) and removes any gaseous inclusions (seeds) that rise to the free surface (336) of the molten glass (16) in the vacuum finer (333). In this embodiment, the vacuum in the vacuum finer (333) is used to draw the molten glass (16) from the free surface (306) in the forebay (339) of the melting furnace (2), vertically through the upflow conduit (334) into the vacuum finer (333). The molten glass (16) then flows from the vacuum finer (333) into a downflow conduit (337), then to a stirring device (4), a cooling and conditioning pipe (5), a bowl (6), and then to the downcomer pipe (7) from which it enters the sheet forming apparatus.

The embodiments of the present invention shown in FIGS. 30, 31A, 31B, 32A, 32B, and 33 eliminate the prior art problem of thermal expansion mismatch between the melting furnace (2) and the delivery system (10) at point (19).

The embodiments of the present invention shown in FIGS. 30, 31A, 31B, 32A, 32B, and 33 facilitate rebuilding only the failed or degraded component(s) of the overflow downdraw process. These embodiments eliminate the need for a complete rebuild of all components when only one component fails. The melting furnace (302) could be rebuilt in place while the delivery system and the sheet forming apparatus are maintained at an elevated temperature. Additionally, these embodiments would permit fabrication and preheating of a melting furnace (302) at a remote location in the factory and the movement, for example by crane or rail, of the preheated melting furnace (302) into the manufacturing position, while keeping the delivery system and sheet forming apparatus at elevated temperature. With the implementation of remote fabrication and preheating of a melting furnace (302), the turnaround in production operation would be measured in days, not weeks. There would also be significant cost savings by rebuilding individual components only when required by manufacturing performance.

A key element of this invention is the matching of the flow characteristics of the delivery system with the flow properties of the overflow downdraw sheet glass manufacturing process. Extensive modeling of glass flow in the overflow downdraw process has generated the knowledge of where the glass from the flow in the delivery system, specifically the downcomer pipe, ends up in the formed sheet. This knowledge allows a radical rearrangement of the delivery system components in comparison to the prior art. The delivery system of the present invention may include one or more of the following embodiments: the stirring device installed prior to the finer, the finer designed such that substandard glass is diverted to the unusable end sections of the formed glass sheet, a glass level measuring device installed in the finer vents without adversely affecting glass quality, the finer vent eliminated when using the apparatus with certain glasses, the bowl replaced by a transition section, the glass that flows in proximity to the internal delivery system surfaces diverted to the unusable end sections of the formed glass sheet, an overflow device to discard inhomogeneous and defective glass located either in the bowl or at the downcomer to inlet pipe interface, and/or using the stirring device to increase the bandwidth of flow control. Preferred embodiments of the delivery system include combinations of one or more of the embodiments discussed herein. These embodiments may also be used in combination with an adjustable and flexible connection between the melting furnace and the delivery system.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A molten glass delivery system comprising:
   a melting furnace configured to contain a quantity of molten glass with a free surface, and
   a stirring device that comprises at least one stirrer configured for pumping action to provide hydrostatic pressure to move glass against gravitational forces from the melting furnace to a greater elevation relative to the free surface of the molten glass in the melting furnace to a glass forming process.

2. The molten glass delivery system of claim 1, wherein the stirrer is positioned to be located below the free surface in a forebay of the melting furnace.

3. The molten glass delivery system of claim 2, wherein a bottom of a casing of the stirring device is positioned to be located below the glass free surface in the forebay.

4. The molten glass delivery system of claim 2, wherein a bottom of a casing of the stirring device is positioned to be located above the glass free surface in the forebay.

5. A molten glass delivery system comprising:
   a) a stirring device configured to receive molten glass from a melting furnace, wherein the stirring device is configured for pumping action and configured to homogenize the glass;
   b) a finer configured to receive molten glass from the stirring device;
   c) a cooling and conditioning section configured to receive glass from the finer; and
   d) a transition section configured to receive the glass from the cooling and conditioning section;
   wherein a bottom of the cooling and conditioning section is positioned to be located above a level of glass in the melting furnace and the stirring device is configured such that the pumping action of the stirring device moves glass into an overflow downdraw process; and
   wherein the stirring device is configured to provide hydrostatic pressure to move glass against gravitational forces from the melting furnace to a greater elevation relative to the level of glass in the melting furnace.

6. A molten glass system comprising:
   a) a melting furnace comprising a forebay configured to contain a quantity of molten glass with a free surface;
   b) a stirring device configured to receive the glass from the forebay of the melting furnace, comprising at least one stirrer configured for pumping action, wherein the stirrer is positioned to be located below the free surface of the glass in the forebay; and
   c) a finer, wherein a bottom of the finer is positioned to be elevated with respect to the free surface;
   wherein the stirrer is configured to provide hydrostatic pressure to move glass upward against gravitational forces from the melting furnace to a greater elevation relative to the free surface of the molten glass in the melting furnace, through the finer, and to a glass forming process.

7. The molten glass system of claim 6, wherein a bottom of a casing of the stirring device is positioned to be located below the free surface of the glass in the forebay.

8. The stirring device of claim 6, wherein the bottom of casing of the stirring device is positioned to be located above the free surface of the glass in the forebay.

* * * * *